United States Patent
Haidar et al.

(10) Patent No.: US 12,241,141 B2
(45) Date of Patent: Mar. 4, 2025

(54) LOW TEMPERATURE REDUCTION OF METAL OXIDES

(71) Applicant: KINALTEK PTY. LTD., Kogarah (AU)

(72) Inventors: Jawad Haidar, Kogarah (AU); Bilal Khan, Kogarah (AU); Rajan Gnanarajan, Kogarah (AU)

(73) Assignee: KINALTEK PTY. LTD., Kogarah (AU)

(*) Notice: Subject to any disclaimer, the term of this patent is extended or adjusted under 35 U.S.C. 154(b) by 141 days.

(21) Appl. No.: 17/922,132

(22) PCT Filed: Apr. 30, 2021

(86) PCT No.: PCT/AU2021/050400
§ 371 (c)(1),
(2) Date: Oct. 28, 2022

(87) PCT Pub. No.: WO2021/217220
PCT Pub. Date: Nov. 4, 2021

(65) Prior Publication Data
US 2023/0295767 A1   Sep. 21, 2023

(30) Foreign Application Priority Data

Apr. 30, 2020 (AU) .............................. 2020901361

(51) Int. Cl.
*C22B 5/04* (2006.01)
*B22F 1/18* (2022.01)
(Continued)

(52) U.S. Cl.
CPC ................. *C22B 5/04* (2013.01); *B22F 1/18* (2022.01); *B22F 9/20* (2013.01); *C01F 7/302* (2013.01);
(Continued)

(58) Field of Classification Search
CPC ........... C22B 5/04; C22B 15/00; C22B 19/20; C22B 23/021; C22B 25/02; C22B 30/02;
(Continued)

(56) References Cited

FOREIGN PATENT DOCUMENTS

| CN | 106384818 A | 2/2017 |
|---|---|---|
| CN | 108199030 A | 6/2018 |

(Continued)

OTHER PUBLICATIONS

Lin et al. A low temperature molten salt process for aluminothermic reduction of silicon oxides to crystalline Si for Li-ion batteries, Energy Environ. Sci., p. 3187-3191, Sep. 23, 2015 (Year: 2015).*

(Continued)

*Primary Examiner* — Brian D Walck
*Assistant Examiner* — Danielle M. Carda
(74) *Attorney, Agent, or Firm* — EcoTech Law Group, P.C.

(57) ABSTRACT

Disclosed herein is a method for reducing a metal oxide in a metal oxide containing precursor. The method comprises providing a reaction mixture comprising the metal oxide containing precursor and an aluminium reductant; heating the reaction mixture in the presence of solid or gaseous aluminium chloride to a temperature at which reactions that result in the metal oxide being reduced are initiated; controlling reaction conditions whereby the reaction mixture is prevented from reaching a temperature at which thermal runaway can occur; and isolating reaction products that include reduced metal oxide.

13 Claims, 4 Drawing Sheets

(51) Int. Cl.
  *B22F 9/20*   (2006.01)
  *C01F 7/302*  (2022.01)
  *C01F 7/42*   (2022.01)
  *C01F 7/786*  (2022.01)
  *C22B 15/00*  (2006.01)
  *C22B 19/20*  (2006.01)
  *C22B 23/02*  (2006.01)
  *C22B 25/02*  (2006.01)
  *C22B 30/02*  (2006.01)
  *C22B 34/34*  (2006.01)
  *C22B 34/36*  (2006.01)

(52) U.S. Cl.
  CPC ............... *C01F 7/42* (2013.01); *C01F 7/786* (2022.01); *C22B 15/00* (2013.01); *C22B 19/20* (2013.01); *C22B 23/021* (2013.01); *C22B 25/02* (2013.01); *C22B 30/02* (2013.01); *C22B 34/34* (2013.01); *C22B 34/36* (2013.01); *B22F 2201/11* (2013.01); *B22F 2301/10* (2013.01); *B22F 2301/15* (2013.01); *B22F 2301/20* (2013.01); *B22F 2301/205* (2013.01); *B22F 2301/255* (2013.01); *B22F 2301/30* (2013.01); *B22F 2301/35* (2013.01); *B22F 2302/256* (2013.01); *B22F 2998/10* (2013.01)

(58) Field of Classification Search
  CPC ..... C22B 34/34; C22B 34/36; C22B 34/1263; C22B 23/02; B22F 1/18; B22F 9/20; B22F 2201/11; B22F 2301/10; B22F 2301/20; B22F 2301/205; B22F 2301/255; B22F 2301/30; B22F 2302/256; B22F 2998/10; B22F 9/22; B22F 2304/058; C01F 7/302; C01F 7/42; C01F 7/786; C01G 23/047; C01G 23/043; Y02E 60/10; H01M 4/38; H01M 4/386; C03C 17/06; C03C 17/22; C03C 2217/256; C03C 2217/28; C03C 2218/345; C01B 33/18; C01B 33/023; C01B 33/182; B82Y 40/00; C01P 2004/64; C01P 2002/72; C01P 2004/80

USPC ......................................................... 75/369
See application file for complete search history.

(56) References Cited

FOREIGN PATENT DOCUMENTS

| CN | 108358206 | A |   | 8/2018  |              |
|----|-----------|---|---|---------|--------------|
| CN | 109694075 | A |   | 4/2019  |              |
| CN | 110386604 | A | * | 10/2019 | ............ B82Y 40/00 |
| CN | 110713187 | A | * | 1/2020  |              |
| WO | WO-2019095016 | A1 | * | 5/2019 | ............ B22F 1/062 |

OTHER PUBLICATIONS

Lin, N, et al., "A Low temperature molten salt process for aluminothermic reduction of silicon oxides to crystalline Si for Li-ion batteries", Energy & Environmental Science, 2015, vol. 8, pp. 3187-3191.

Zhou, Z-W. et al., "Aluminothermic reduction enabled synthesis of silicon hollow microspheres from commercialized silica nanoparticles for superior lithium storage", ChemicalCommunications, 2016, vol. 52, pp. 8401-8404.

International Search Report and Written Opinion received for International Application No. PCT/AU2021/050400, mailed on Jul. 16, 2021, 12 Pages.

Extended European Search Report received for European Patent Application No. 21794463.6, mailed on May 8, 2024, pp. 15.

Dao-Lai Fang et al. "Highly efficient synthesis of nano-Si anode material for Li-ion batteries by a ball-milling assisted low-temperature aluminothermic reduction", Electrochimica Acta, available at "https://www.sciencedirect.com/science/article/abs/pii/S0013468619322182#:~:text=A%20nano%2Dsized%20Si%20anode,powder%20as%20the%20starting%20materials" published on Nov. 21, 2019, pp. 10.

Haiping Jia et al. "Hierarchical porous silicon structures with extraordinary mechanical strength as high-performance lithium-ion battery anodes", Nature Communications, available at "https://www.nature.com/articles/s41467-020-15217-9" published on Mar. 19, 2020, pp. 9.

* cited by examiner

LOW TEMPERATURE REDUCTION OF METAL OXIDES

RELATED APPLICATION

This application is a National Stage Application of PCT/AU2021/050400, filed on Apr. 30, 2021 which claims the priority from Australian Application No. 2020901361 filed on Apr. 30, 2020, which is incorporated herein by reference for all purpose.

TECHNICAL FIELD

The present invention relates to methods for the reduction of metal oxides, particularly methods for low temperature reduction of metal oxides.

BACKGROUND ART

Reduction of metal oxides to their constituent metals (or metal suboxides) can be carried out using carbothermic processes at temperatures above 1000° C. or metallothermic processes (e.g., aluminothermic or magnesiothermic) using molten metals at temperatures above 700° C. For aluminothermic processes, reduction of metal oxides with molten Al is highly exothermic and difficult to control, often resulting in the formation of molten metals mixed with $Al_2O_3$, where removal of the $Al_2O_3$ is difficult and which therefore limits use of the resulting products. For aluminothermic reduction of metal oxides, all existing processes are carried out at temperatures higher than the melting point of Al and they normally induce a thermal runaway with temperatures reaching up to 2000° C. It is very difficult to control these reactions and the reaction products tend to be a fused mixture of the metals (or metal suboxides) and by-products, necessitating significant further processing.

There has been considerable recent interest in microporous (or nano-porous) silicon for applications relating to Li-ion energy storage systems; the use of Si powder with appropriate superfine morphology as anode materials in Li-ion batteries (LIBs) can provide considerable increase in battery capacity while minimising problems associated with excessive volume increases during lithiation of the Si-based anode. The use of metallothermic processes to produce Si powders from $SiO_2$ is not generally possible, however, because the reaction products of the metallothermic processes do not have an appropriate superfine morphology.

A number of research groups have attempted to reduce $SiO_2$ at lower temperatures. For example, Bao et al. (*Nature* Vol 446, 172 2007) proposed reduction using magnesium at 650° C. to produce microporous silicon structure, but processing is typically slow as it is limited by vapour pressure of Mg at 650° C. Moreover, for this approach, MgO by-products needs to be separated from the Si powder products. Ning Lin et al. (*Energy Environ. Sci.*, vol 8, 3187 (2015) and *Communications Chemistry*, vol 1, 42 (2018)) suggested mediated reduction of silicon oxides with Al and Mg in molten aluminium chloride at temperatures as low as 200° C. However, aluminium chloride sublimes at ~180° C. at atmospheric pressure and the formation of molten aluminium chloride requires a pressure above 2 atmospheres and a temperature above 190° C., necessitating a relatively complicated reaction chamber. According to Ning Lin et al, reduction using the molten aluminium chloride route requires around 10 hours to complete and has a maximum yield below 75%.

It would be advantageous to provide new methods for reducing metal oxides that can be performed at lower temperatures than conventional metallothermic processes.

SUMMARY OF INVENTION

In a first aspect, the present invention provides a method for reducing a metal oxide in a metal oxide containing precursor. The method comprises:
  providing a reaction mixture comprising the metal oxide containing precursor and an aluminium reductant;
  heating the reaction mixture in the presence of solid or gaseous aluminium chloride to a temperature at which reactions that result in the metal oxide being reduced are initiated;
  controlling reaction conditions whereby the reaction mixture is prevented from reaching a temperature at which thermal runaway can occur; and
  isolating reaction products that include reduced metal oxide.

The inventors have surprisingly and unexpectedly discovered that that presence of aluminium chloride in a solid form or gas/vapour form with a reaction mixture including metal oxides and an aluminium reductant both reduces the threshold reaction temperature (i.e. the temperature to which the reaction mixture needs to be heated to in order to initiate the reduction reactions) and improves control over both the reaction kinetics and the quality of the products (e.g. the range and characteristics of products that can be produced).

The present invention thus provides a method for low-temperature reduction of metal oxides (e.g. the metal oxides of one or more of: Si, Zn, Cu, Fe, Ni, Sn, Sb, Mo, W, Ta, Nb, V, Ti, Co, Cr, In, Ag, Mn, Pt, Pd, Zr, Rh, Ru, Os and Re) at atmospheric pressure using a reducing combination of solid Al powder, and solid or gaseous aluminium chloride as reducing agents. The aluminium chloride acts in a dual role as a reducing agent and as a reactant aide between the oxides and the Al, and overall, it enables direct and fast reduction of metal oxides to the metal at relatively low temperatures (e.g. below 600° C.). As will be described below, the by-products can be aluminum oxychloride and/or aluminium oxide, which are more easily separable than for conventional metallothermic reactions, and yields can be up to more than 99%.

Low temperature aluminothermic reduction of metal oxides is attractive as it enables reduction using solid Al reactants, with less energy consumption and with potential to produce reaction products having nano-morphologies and structures usually unobtainable using normal aluminothermic reduction. Also, many aluminium reductants (e.g. Al powder) are safe, have a low-cost and are readily available, making the materials attractive from a techno-economic perspective.

Further, low temperature reduction of $SiO_2$ would allow for production of silicon nanoparticles or microporous silicon starting from silica precursors with a morphology well suited for use in applications relating to Li-ion energy storage systems, such as those described above.

In preferred embodiments therefore, the invention may achieve a significant reduction in the temperature required by conventional reduction techniques and other existing processes requiring high temperatures or high pressures. Further, the invention may enable the production of powders of metal compounds with improved engineered properties, as well as new products with unique characteristics inherited from the starting precursor oxides. The temperatures reached in conventional metallothermic reactions preclude such advantages.

In some embodiments, the aluminium chloride may be provided in the form of solid aluminium chloride. The aluminium chloride may be provided in the form of a powder or granules with a particle size less than 5 mm. In some embodiments, the aluminium chloride powder may be included in the reaction mixture (e.g. pre-mixed with the aluminium reductant).

In some embodiments, the aluminium chloride may be provided in the form of gaseous aluminium chloride. The gaseous aluminium chloride may, for example, be caused to flow over the heated reaction mixture.

In some embodiments, the reaction mixture may be heated in the presence of both solid and gaseous aluminium chloride.

In some embodiments, the amount of the aluminium chloride may be between 1 wt % and 500 wt % of the weight of the metal oxide containing precursor.

In some embodiments, the reactants in the reaction mixture may each independently be provided in the form of a powder, flakes, fibers or particulates.

In some embodiments, the aluminium reductant may be aluminium or an aluminium alloy. In some embodiments, the aluminium or an aluminium alloy may be provided in the form of a powder or flakes with a particle size of less than about 50 μm in at least one dimension.

In some embodiments, the amount of the aluminium reductant in the reaction mixture may be between 5 wt % and 500 wt % of the weight of the metal oxide containing precursor.

In some embodiments, the temperature to which the reaction mixture is heated (i.e. in order to initiate the reduction reactions) may be less than 800° C., preferably less than 600° C. or preferably less than 500° C. As described herein, lower temperatures of reaction are preferable because the reaction products are not molten (and hence more easily purified) and may retain the morphologies of the reagents.

In some embodiments, the reaction mixture is heated in an inert atmosphere (i.e. an atmosphere that is inert to the reactants, which may include a $CO_2$ or $N_2$ atmospheric).

In some embodiments, the reaction mixture is heated at a pressure of between about 0.8 to 1.2 atmospheres, preferably at atmospheric pressure. Reactions performed at, or near, atmospheric pressure require less sophisticated equipment, are safer and are generally cheaper to perform.

In some embodiments, the reaction conditions may be controlled by gradually feeding additional one or both of the metal oxide containing precursor and the aluminium reductant into the heated reaction mixture. Such gradual introduction of reactants to the reaction mixture prevent thermal runaway due to the lack of availability of reactants at any given time. In some embodiments, the reaction conditions may be controlled by cooling the reaction mixture. In some embodiments, the reaction conditions may be controlled by adding a thermal load moderator to the reaction mixture. The thermal load absorbs heat produced by the highly exothermic inaction and helps to control reaction rates by separating the reactants. In some embodiments, two or more methods of controlling the reaction conditions may be used.

In some embodiments, the reduced metal oxide may be elemental metal, a metal suboxide, an alloy including the metal, a compound including the metal, a composite including the metal or mixtures thereof.

In some embodiments, the reaction products may comprise the product resulting from reducing the metal oxide and one or more by-products selected from one or more of aluminium chloride, aluminium oxychloride and aluminium oxide. In some embodiments, the reaction products may be further processed to separate by-products from the product resulting from reducing the metal oxide. In some embodiments, the by-products may include aluminium oxychloride, where the aluminium oxychloride is separable from the reduced metal oxide by washing the reaction products in an aqueous medium.

In some embodiments, any gaseous aluminium chloride formed during the reaction may be condensed for beneficial reuse, such as for recycling, back into the reaction mixture.

In some embodiments, heating the reaction mixture comprises a plurality of heating steps and the formation of intermediate species. Embodiments of such will be described in further detail below.

In one particular embodiment of the method of the first aspect of the present invention, the metal oxide is $SiO_2$, the aluminium reductant is aluminium or an aluminium alloy in a solid powder form, the reaction mixture is heated to an initiation temperature of between about 400° C. and 600° C. and the reaction conditions controlled to maintain the temperature below about 650° C. The reaction products of such a method may be silicon or a mixture of silicon and $SiO_2$ having a particle site of less than 500 nm.

In some embodiments, the method may further comprise a step in which the reaction products are subsequently reacted with metal chlorides or metal oxides of one or more of: Zn, Cu, Fe, Ni, Sn, Sb, Mo, W, Ta, Nb, V, Ti, Co, Cr, In, Ag, Mn, Pt, Pd, Zr, Rh, Ru, Os and Re.

In a second aspect, the present invention provides a crystalline silicon powder produced according to the method described in the preceding two paragraphs, wherein the crystalline silicon powder is in the form of particulates with irregular shapes and a mean particle size between 10 nm and 500 nm; and the composition includes Al at levels between 0.01 wt % and 70 wt %.

In a third aspect, the present invention provides a product produced according to the method described in the preceding three paragraphs, wherein the metal oxide containing precursor is provided in the form of flakes, powder or heads comprising $SiO_2$, the product comprising particles having a $SiO_2$-containing core and a coating having a thickness of between 1 nm and 300 nm and containing at least 50 wt % silicon. In some embodiments, the $SiO_2$-containing core may comprise one or more of $SiO_2$, borosilicate, soda glass, synthetic mica and mica.

In a fourth aspect, the present invention provides a method for reducing a metal oxide in a metal oxide containing precursor. The method comprises:
  providing a reaction mixture comprising the metal oxide containing precursor and a magnesium reductant;
  heating the reaction mixture in the presence of solid or gaseous aluminium chloride to a temperature at which reactions that result in the metal oxide being reduced are initiated;
  controlling reaction conditions whereby the reaction mixture is prevented from reaching a temperature at which thermal runaway can occur; and
  isolating reaction products that include reduced metal oxide.

Given the similarities between aluminothermic and magnesiothermic processes, the inventors believe that the teachings of the present invention will also be applicable to magnesiothermic processes, where a magnesium reductant is used in place of an aluminium reluctant.

In a fifth aspect, the present invention provides a method for reducing $SiO_2$ in a $SiO_2$ containing precursor. The method comprises:

providing a reaction mixture comprising the $SiO_2$ containing precursor and an aluminium reductant;

heating the reaction mixture at atmospheric pressure in the presence of gaseous aluminium chloride to a temperature at which reactions that result in the $SiO_2$ being reduced are initiated;

controlling reaction conditions whereby the reaction mixture is prevented from exceeding a temperature of about 650° C.; and isolating reaction products, that include silicon.

In a sixth aspect, the present invention provides a reduced a metal oxide produced by the method of any one of the first, fourth and fifth aspect of the present invention.

BRIEF DESCRIPTION OF DRAWINGS

Features, embodiments and advantages of the present invention will become apparent from the following description of embodiments thereof, by way of example only, with reference to the accompanying drawings, in which.

DETAILED DESCRIPTION

Figure 1:
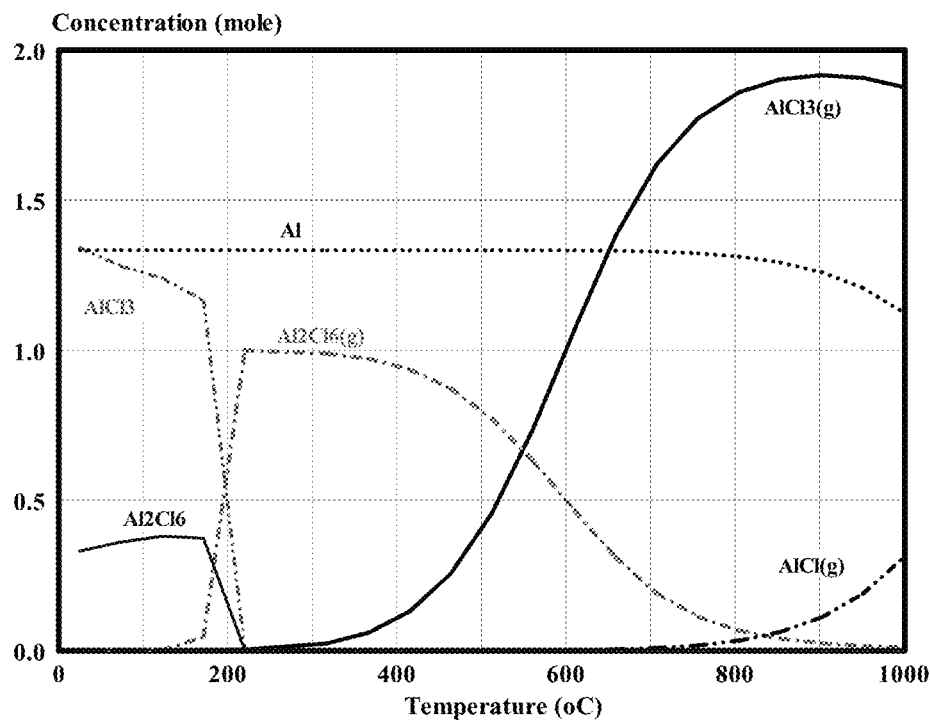
FIG. 1 shows equilibrium composition for a mixture of Al—$AlCl_3$ at temperatures up to 1000° C.

Herein, and unless explicitly expressed otherwise:

the terms "base metal" and "$M_c$" refer to any one or more metals selected from the group comprising Si, Zn, Cu, Fe, Ni, Sn, Sb, Mo, W, Ta, Nb, V, Ti, Co, Cr, In, Ag, Mn, Pt, Pd, Zr, Rh, Ru, Os and Re; and the terms "base metal oxide(s)" and "$M_cO_x$" refer to the corresponding oxide(s), the terms "aluminium reductant", "reducing Al agent", "reducing Al alloy" and "reducing Al powder" are used interchangeably and refer to powders of pure Al and alloys based on Al, references to a material being "based on", or example the base metal or alloy based on Al as a reducing agent, refer to the material comprising at least 10% and preferably at least 50% of the nominated constituent, the term "aluminium chloride" refers to the chlorides of Al such as $AlCl_3$ and $Al_2Cl_6$. Where used, the terms "aluminium chloride" or "aluminium chlorides" or "$AlCl_3$" include reference to any anhydrous metal chlorides based on Al—Cl, in both gaseous form and solid form, where used, the term "$AlCl_3(g)$" refers to any aluminium chlorides in a gaseous or vapour form, where used, the term "$AlCl_3(s)$" refers to any aluminium chlorides in a solid powder form, the terms "AlOCl/$Al_2O_3$" means AlOCl and/or $Al_2O_3$, the terms "AlOCl" and "aluminium oxychloride are used interchangeably, and the terms "silicon oxide", "silica" and "$SiO_2$" refer to silicon oxides in both amorphous and crystalline form.

One form of the present invention provides a method for forming metal-based powders through reacting a powder mixture comprising reducible precursor base metal oxides and a reducing Al alloy (e.g., Al powder) in the presence of aluminium chlorides to reduce the metal oxides partially or entirely to their base metals. The base metal oxides are based on one or more of Si, Zn, Cu, Fe, Ni, Sn, Sb, Mo, W, Ta, Nb, V, Ti, Co, Cr, In, Ag, Mn, Pt, Pd, Zr, Rh, Ru, Os and Re. The aluminium chlorides are in the form of a solid powder form or a gas/vapour form. In some embodiments, the aluminium chloride can be in the form a liquid eutectic phase.

As noted above, the inventors have discovered that addition of $AlCl_3$ in a solid form or gas/vapour form to a mixture of base metal oxides Al powder reduces the threshold reaction temperature and improves control over both the reaction kinetics and the quality of the products.

The reduction reaction between the precursor metal oxide, and the reducing reactants of Al and $AlCl_3$ are exothermic, and the method includes procedures for controlling the reduction reaction and moderating the reaction rate in order to prevent thermal runaway and the attendant reaction products.

The product of the method is a powder based on the base metals, and the by-products comprise aluminium chloride and aluminium oxychloride and/or aluminium oxide. The aluminium oxychloride/aluminum oxide by-products are discharged with the product and can be constituents of the powder product or they can be separated by appropriate means. The aluminium oxychloride by-products can be separated from the base metals (e.g. Si powder) by washing in a suitable solvent (e.g., $H_2O$ or diluted HCl($H_2O$—HCl)).

Example forms of the inventive method aim to achieve significant reduction in the temperature required by conventional reduction techniques and other existing processes requiring high temperatures or high pressures. Also, they aim to provide powders of metal compounds with improved engineered properties and new products with unique characteristics inherited from the starting precursor oxides.

The present invention comprises a number of aspects, specific forms and embodiments of which will be described below.

In accordance with a first example, there is provided a method for reducing solid precursor chemicals based on base metal oxides with reducing agents based on Al in a solid form and aluminium chloride in a solid form or a gas/vapour form, preferably at atmospheric pressure, at temperatures below 800° C., and preferably below 600° C., and more preferably at temperatures between 100° C. and 600° C. and still more preferably at temperatures between 200° C. and 600° C., and still more preferably at temperatures between 300° C. and 600° C., and yet still more preferably at temperatures between 400° C. and 600° C., wherein the method includes:

mixing, heating and reacting a reactant mixture comprising powders based on base metal oxides and Al in the presence of solid or gaseous aluminium chloride; and the product of the method comprises compounds based on the base metals; and the by-products include AlOCl and/or $Al_2O_3$; and wherein the products of the method are optionally processed to remove the by-products.

Examples of products include pure metals such as Zn, W, Si powder, and Si and Cu nanopowders. Other examples include partially reduced particulate metal suboxides such as titanium suboxides. Other examples include metallic silicon nano-particulates, Si—Ag nanoparticles, $SiO_2$ particulates coated with metallic silicon, compositions corresponding to silicon monoxide (SiO or $SiO_2$) or a mixture thereof.

In accordance with a second example, there is provided a stepwise method for production of metallic systems based on Zn, Cu, Fe, Ni, Sn, Sb, Mo, W, Ta, Nb, V, Ti, Co, Cr, In, Ag, Mn, Pt, Pd, Zr, Rh, Ru, Os and Re, wherein:

in a first step, base metals, oxides are reacted with aluminium chlorides and optionally Al at temperatures up to 500° C., and preferably at pressures below 1.2 bar and more preferably at atmospheric pressure, to produce an intermediate product comprising base metal chlorides or base metal oxychlorides; and in a second step, the resulting intermediate product is further reacted with Al and optionally $AlCl_3$ at temperatures below 700° C. to produce a powder product based on alloys and compounds of the base metals.

Gaseous aluminium chloride by-products may be continuously removed and solid by-products such as aluminium oxide and/or aluminium oxychloride may be discharged with the products and may be subsequently separated by appropriate post processing means.

In accordance with a third example, there is provided a method for production of metallic systems based on Si, Zn, Cu, Fe, Ni, Sn, Sb, Mo, W, Ta, Nb, V, Ti, Co, Cr, In, Ag, Mn, Pt, Pd, Zr, Rh, Ru, Os and Re, wherein precursors comprising base metal oxides are reacted with an Al powder in the presence of gaseous aluminium chlorides $AlCl_3(g)$ at temperatures between 300° C. and 800° C., and preferably at temperatures between 400° C. and 800° C., and more preferably at temperatures between 400° C. and 600° C. to produce a product comprising metallic alloys and compounds of the base metals and a by-product comprising aluminium oxychloride and/or aluminium oxide.

In accordance with a fourth example, there is provided a method for producing crystalline silicon nanoparticles, wherein precursors comprising $SiO_2$ powders are reacted with Al and gaseous aluminium chlorides:

at a pressure below 1.2 bar, and preferably at atmospheric pressure;

and at temperatures below 600° C., and preferably at temperatures between 400° C. and 600° C.;

to form a product comprising metallic crystalline silicon nanoparticles and solid by-products comprising aluminium oxychloride (AlOCl). Alloying additives may be included through suitable precursors containing the additives. Excess aluminium chloride is recycled through the process and other solid by-products are discharged with the powder products and can be subsequently separated from the crystalline silicon powder by appropriate post processing means; AlOCl and any residual Al may be removed by washing in a suitable solvent capable of dissolving AlOCl such as $H_2O$ and diluted HCl ($H_2O$—HCl). Residual unreacted precursors can form a part of the final product or alternatively they may be removed using other suitable means. The crystalline silicon nanoparticles can be in various forms, including a porous skeletal form, a nanostructure particulate form, hollow spheres, nanoparticles or nanorods.

In accordance with a fifth example, there is provided a method for production of silicon-coated substrates wherein in a first step, precursors comprising a powdery substrate base on $SiO_2$ are reacted with Al and $AlCl_3$ in either a solid powder form or in a gaseous form:

at a pressure below 1.2 bar, and preferably at atmospheric pressure;

and at temperatures below 600° C., and preferably at temperatures between 400° C. and 600° C.;

to reduce silicon oxides in the tap layer of the substrate particles and produce a product consisting of a substrate coated with a metallic film based on silicon. Solid by-products such as aluminium oxychloride and aluminium oxide are discharged with the products and may be subsequently separated by appropriate post processing means.

In accordance with a sixth example, there is provided a stepwise method for production of metallic compounds based on Si, B, C, Zn, Cu, Fe, Ni, Co, Cr, Mo, Sn, Ti, In, Sb, Ag, V, Mn, Pt, Pd, Ta, Zr, Nb, Rh, Ru, Os, Re and W, wherein:

in a first step, precursors based on $SiO_2$ are reduced with Al and $AlCl_3$ in either a solid powder form or in a gaseous form at temperatures below 600° C., and preferably at temperatures between 400° C. and 600° C. to produce an intermediate product comprising metallic Si, according to the fourth aspect or the fifth aspect and wherein the intermediate product is in the form of a mixture comprising Si—AlOCl or in a form of a powder based on Si alter the AlOCl have been removed; and in a second step, the intermediate products are reacted with base metal precursors based on the oxides or the chlorides of the base metals; and wherein, $AlCl_3$ in a solid powder form or in gaseous form is optionally included with other reactants; and wherein, reactions between the intermediate products and said base metal precursors are carried out at temperatures between 100° C. and 700° C., leading to a product based on the said base metals and a by products including gaseous silicon chloride; and the product can be in the form of a powder comprising compounds based on the base metals, or in the form of a silicon-based powder coated with base metals, or in the form of a powder consisting of particles with $SiO_2$—Si core coated with compounds based on the base metals, or in the form of a powder comprising compounds based on base metal suicides; and in an optional third step, the products from the second step are heated at temperatures above 600° C. to convert any aluminium oxychloride present in the solid powder product to aluminium oxide; and in an optional fourth step, the solid powder product from the second step or the third step is washed to separate residual metal chloride and oxychloride by-products.

In accordance with a seventh example, there is provided a method for production of metallic nanoparticles based on Si, Zn, Cu, Fe, Ni, Co, Cr, Mo, Sn, Ti, In, Sb, Ag, V, Mn, Pt, Pd, Ta, Zr, Nb, Rh, Ru, Os, Re and W, wherein precursors comprising base metal oxides are reacted with Al in the presence of aluminium chlorides according to any of examples one to six and the products are in the limn of particulates with a mean particle sine between 10 nm and 500 nm, and preferably below 500 nm, and more preferably below 300 nm and still more preferably below 100 nanometres.

Also disclosed herein is an apparatus for reducing metal oxide-containing compounds, comprising:
- a reactor vessel equipped with a mixer and capable of processing $N_cO_x$-based powders, metal chlorides, and metallic powders at temperatures up to 800° C.; and
- storage container, for holding reactants; and
- accessories for mixing, milling, and feeding powders; and
- a condenser and collection vessels for collecting and holding and storing by-products and powder products; and
- a scrubbing unit to clean processing gases from any residual by-products.

Typically, the apparatus is suitable for implementing the method of any of the aspects and embodiments of the invention described herein. A suitable apparatus can be a stainless-steel vessel equipped with a mixer and means for keeping an inert atmosphere and would have the ability to handle aluminium chloride both as a vapour or as a solid powder. Another suitable apparatus can be a fluidised bed or a moving bed, wherein the materials dynamics is arranged in such a way to maximise impact of aluminium chlorides on reactions involving base metal compounds and Al.

It is well known that metal oxides can react with molten Al at temperatures between 660° C. and 1200° C., usually with a self-propagating reaction/thermal runaway, and leading to formation of molten metals mixed with $Al_2O_3$, where removal of the $Al_2O_3$ is difficult. As indicated, for oxides based on Si, Zn, Cu, Fe, Ni, Co, Cr, Mo, Sn, Ti, In, Sb, Ag, V, Mn, Pt, Pd, Ta, Zr, Nb, Rh, Ru, Os, Re and W, the inventors have surprisingly discovered that the addition of $AlCl_3$ in a solid form or a gaseous form to a mixture of $M_cO_x$—Al at about atmospheric pressure can reduce the threshold reaction temperature to below 600° C. and provide control over reaction mechanisms, which can advantageously lead to the formation of a specific metallic powders based on the base metals.

Moreover, for a number of base metals, the by-product is a solid AlOCl powder that can be separated from the metallic powder product by washing and filtering (e.g., in $H_2O$ or diluted HCl)—in contrast to an $Al_2O_3$ by-product that is difficult to remove. Also, because reactions according to the present method do not involve liquid metals and no excessive heating, it is possible for a number of base metals to conserve morphological features from the starling $M_cO_x$ (e.g., Si nanopowders from $SiO_2$ nanopowders). Overall, the outcome includes significant improvements to the quality of the products with major simplifications in the processing conditions usually required.

As noted above, it is known that $SiO_2$ can react with Al in molten $AlCl_3$ under high pressure conditions suitable for formation of liquid $AlCl_3$ and at temperatures up to 250° C. to produce a mixture of Si—$SiO_2$. This method, however, suffers from a number of significant problems, including the requirement for high pressure in order to produce molten $AlCl_3$. Further, despite long reaction times (>10 hours), the maximum reported yield is 75%. The inventors have discovered, that using gaseous $AlCl_3$ allows for reduction of $SiO_2$ to Si to be carried out at atmospheric pressure at temperatures between 400° C. and 600° C., with yields up to 99% over short times. Liquid $AlCl_3$ simply cannot exist under the reaction conditions of the present invention.

Example forms of the method provide an enhanced product technique with advantages over prior technologies, due to its ability to reduce processing temperatures and time, and extend the range of materials that can be produced. The exemplary forms of the present approach differ from prior art carbothermic and metallothermic processes in several other major aspects:
1—the novel low temperature reduction process combines the advantages of the oxide and chloride chemistry; and
2—the method reduces the threshold reaction temperature and allows for synthesis of compositions and morphologies usually unobtainable under conditions prevailing in carbothermic and metallothermic processes (e.g., nanoparticle morphology, complex compositions); and
3—the method is carried out under mild conditions of atmospheric pressure and relatively low temperatures; and
4—the process requires low energy input and produces no or minimal waste; and
5—Al is an attractive reducing agent due to its ready availability and low cost, and its compounds are valuable industrial chemicals and do not present considerable handling difficulties (e.g., $AlCl_3$).

DETAILED DESCRIPTION OF THE INVENTION

As described above, in its preferred embodiments, the present invention provides a low temperature method for direct production of metallic compositions based on Si, Zn, Cu, Fe, Ni, Sn, Sb, Mo, W, Ta, Nb, V, Ti, Co, Cr, In, Ag, Mn, Pt, Pd, Zr, Rh, Ru, Os and Re.

Accordingly, there is provided a method for reducing a solid precursor powder based on metal oxides with a reducing Al alloy in a powder form and aluminium chloride in a reaction vessel at temperatures below 800° C., and preferably below 600° C., and more preferably at temperatures between 180° C. and 600° C., and still more preferably between 300° C. and 600° C., and most preferably between 400° C. and 600° C., wherein the method includes:

Step 1: mixing, heating and reacting a reactant mixture comprising powders of metal oxides based on one or more of the base metals Si, Zn, Cu, Fe, Ni, Sn, Sb, Mo, W, Ta, Nb, V, Ti, Co, Cr, In, Ag, Mn, Pt, Pd, Zr, Rh, Ru, Os and Re with a reducing Al alloy in the presence of aluminium chloride;
wherein the aluminium chloride is in a gaseous or solid form; and the amount is between 1% and 500 wt % of the weight of the precursor metal oxides; and the product of the method comprises compounds based on the base metals; and the by-products include aluminium chloride, and aluminium oxychloride and/or aluminium oxide; and
wherein reactions between the base metal oxides and the reducing Al agent are exothermic; and
wherein pressure in the reaction vessel is kept below the threshold pressure required to produce molten $AlCl_3$; and
wherein one or more of the solid precursor powders based on metal oxides, the reducing Al alloy powder and the aluminium chloride are gradually fed into the reaction vessel; and Step 2: products at the end of Step 1 are optionally processed to remove the by-products and obtain an end-product in the form of a powder based on Al, Si, Zn, Cu, Fe, Ni, Sn, Sb, Mo, W, Ta, Nb, V, Ti, Co, Cr, In, Ag, Mn, Pt, Pd, Zr, Rh, Ru, Os and Re.

The inventors discovered that for most of the base metals (e.g., Zn, Cu, Ni, Sb, W . . . ), $AlCl_3$ plays the key role of mediating reactions between aluminium and metal oxides leading to formation of active intermediates that tend to re-react with Al or the oxides at low temperatures. Examples of the intermediates include metal chlorides, metal oxychlorides and gaseous aluminium monochloride (AlCl(g)). The resulting effect is that the threshold reaction temperature is reduced, thus providing better control over reaction rates and expanding the range and characteristics of products that can be produced.

The product is a powder made of a pure metal, an alloy, a compound or a composite based on the base metals and can include any number of additives. The by-products are mainly AlOCl and/or $Al_2O_3$, and aluminium chloride; however, there may also exist residual base metal chlorides and residual unreacted Al and unreacted base metal oxides. The AlOCl is desirable as a by-product because it can the easily separated from the metallic powder products. The inventors find that $Al_2O_3$ is usually the by-product when the reactants are heated at temperatures above 600° C. For example, for fine ZnO precursors, the by-product is AlOCl when the reaction is carried out at temperatures starting from 100° C. and increasing to around 500° C. and in particular when the reaction starts with $AlCl_3$(s) at less than 200° C. In contrast, $Al_2O_3$ is the by-product when ZnO is reacted with Al and gaseous $AlCl_3$(g) at 550° C. Also, when the by-product is AlOCl, increasing the temperature of the reactants above 600° C. causes the AlOCl to disproportionate into gaseous $AlCl_3$ and $Al_2O_3$, and then the final product would be a Zn—$Al_2O_3$ mixture. Products in the form of $M_c$-$Al_2O_3$ are readily obtainable for all base metals, and products in the form of $M_c$-AlOCl can be obtained fix a number of base metals at temperatures below 600° C.

Chemical Reactions within the $M_cO_x$—Al—$AlCl_3$ System

For a first group of elements (Group I), including Zn, Cu, Ni, Fe, Mo, Sn, Sb, V, Mn, and W, the reaction path involves reacting solid $AlCl_3$ with the precursor oxides and Al. Here, the by product is typically AlOCl when reaction temperature is kept below a maximum around 600° C. For this Group I, $Al_2O_3$ is the by-product when the reactant temperature increases above 600° C. or when processing is carried out at temperatures above 500° C. using gaseous aluminium chloride $AlCl_3$(g).

For a second group of elements (Group II), consisting only of silicon, successful reduction of $SiO_2$ to Si can only be done through reacting $SiO_2$ with Al in the presence of gaseous $AlCl_3$(g) at temperatures between 400° C. and 600° C. and preferably between 450° C. and 600° C., and usually leads to formation of metallic Si and an AlOCl by-product.

Group III comprises elements with oxides that do not conform to the direct reaction paths for Group I using solid $AlCl_3$(s) and Group II using gaseous $AlCl_3$(g). Group III comprises elements with multiple oxides, including elements from Group I.

Group I:

For most oxides in Group I, the reaction proceeds in two steps, wherein the oxides are first converted to Cl-based intermediates (or for some elements Cl—O based intermediates), followed by reactions between the intermediates and Al, leading to the base metals:

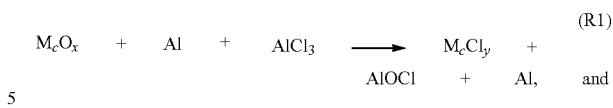

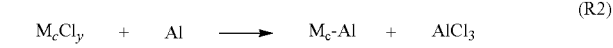

With an overall reaction:

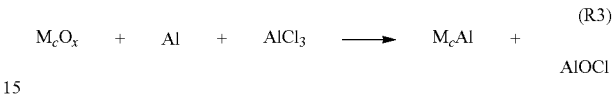

The inventors carried out extensive testing around this reaction scheme and demonstrated reactivity according to R1 and R2 both as separate reactions and also as a combined reaction system as per R3. Detailed experimental results according to this scheme have been obtained for a large number of elements including Zn, Cu, Ni, Fe, Mo, Sn, Sb, V and W.

For example, for Zn, the inventors find that without $AlCl_3$, reaction between ZnO and Al starts at around 700° C. and leads to uncontrollable reactions with a steep increase in the temperature of the reactants. Adding $AlCl_3$ to the reactants changes the reaction path and then, in a first step, ZnO reacts with $AlCl_3$ (and possibly Al) at around 100° C. to produce $ZnCl_2$ and AlOCl, followed by a second step at around 220° C., where $ZnCl_2$ and Al react further to form Zn and $AlCl_3$. Exothermic energy release by the two reactions can increase the reactant temperature to around 800° C. However, the method includes procedures for controlling reaction rates and preventing thermal runaway effects, the reactants are mixed with pre-processed materials that act both as a thermal load moderating temperature increases and also as physical barrier limiting contact surface area between the reactants and reducing the rate of exothermic energy release.

For reduction of ZnO using the present method, reaction yields up to more than 99% can be achieved for short processing times less than 30 minutes at processing temperatures less than 400° C.

For the example of Fe, using $Fe_2O_3$ and Al without $AlCl_3$ requires processing temperatures above 800° C. to trigger the exothermic reaction which then raises the reactant temperatures up to 2000° C., as per the well-known thermite welding process. The addition of $AlCl_3$ reduces the threshold reaction temperature to less than 500° C. and the present invention includes procedures to control exothermic heat release and gain control over the quality and characteristics of reaction products; the addition of $AlCl_3$ results in formation of intermediate species (e.g., $FeCl_3$, $FeCl_2$, iron oxychlorides . . . ) at temperatures below 300° C., triggering further reactions with Al and leading to completing the reduction process.

For the example of Cu, adding $AlCl_3$ to a mixture of CuO and Al leads to reactions between $AlCl_3$ and CuO commencing at around 100-150° C., followed by another set of reactions at temperatures above 200° C. To complete the reaction, the materials can be brought to higher temperatures below 600° C. to maximise reaction speed and yield.

For the example of Ni, the addition of $AlCl_3$ to a mixture of NiO—Al reduces the threshold reaction temperature between NiO and Al to around 420° C.

For the example of W, the addition of $AlCl_3$ to a starting reactant mixture of $WO_3$ and Al results in formation of intermediate species including tungsten oxychloride and tungsten chlorides in addition to potential eutectic $AlCl_3$—$WCl_x$ phases. The resulting intermediates react in a second step with $Al/AlCl_3$ leading to W powder. For W, maximum processing temperature is between 450° C. and 600° C. However, reactions involving tungsten oxides are highly exothermic and any loss of control over the reaction kinetics can increase the temperature to more than 600° C. resulting in formation of $Al_2O_3$ instead of AlOCl.

Group II:

For Group II ($SiO_2$), in contrast to existing techniques for reduction of silicon oxides, the present method enables reactions between $SiO_2$, Al and $AlCl_3$ to occur at about atmospheric pressure in the range 450-600° C. according to the overall reaction:

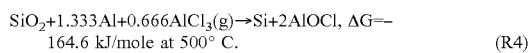

$SiO_2 + 1.333 Al + 0.666 AlCl_3(g) \rightarrow Si + 2AlOCl$, $\Delta G = -164.6$ kJ/mole at 500° C. (R4)

Processing according to this scheme is carried out under inert gas (e.g., Ar, $N_2$ or $CO_2$) at 1 atmosphere in an open reactor vessel. Extensive testing has been carried out by the inventors to identify potential reaction mechanisms within the $SiO_2$—Al—$AlCl_3$(g) system. The results indicate that for fine precursor chemicals such as fumed silica and fine Al powder, yields up to 99% can be obtained for short processing times less than 1 hour.

The inventors find that most critical factor affecting yield is the availability of gaseous $AlCl_3$ (g) in the atmosphere of the reaction zone; for example, for a fixed processing time and for the same total amount of $AlCl_3$ precursor, reducing the concentration of $AlCl_3$(g) by 10% through dilution with argon reduces the yield to less than 75%.

Other attempts by the inventors to introduce $AlCl_3$ in a liquid form through an eutectic $AlCl_3$—NaCl mixture—which was stable at temperatures up to 550° C.—proved significantly less efficient than using gaseous $AlCl_3$(g), with poor yields less than 50%.

For Si, extensive analyses carried out for a large number of as-obtained samples produced under different processing conditions at temperatures below 600° C. all show the by-products to be AlOCl with no evidence for significant $Al_2O_3$.

Analysis of the $SiO_2$—Al—$AlCl_3$ system, together with numerical simulations and experimental evidence based on measurements and observations indicate three potential reaction paths:

i. Reactions between $AlCl_3$(g) and $SiO_2$:

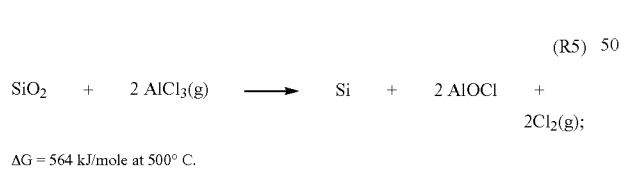

$SiO_2 + 2 AlCl_3(g) \longrightarrow Si + 2 AlOCl + 2Cl_2(g);$ (R5)

$\Delta G = 564$ kJ/mole at 500° C.

followed by reactions between $Cl_2$(g) and Al:

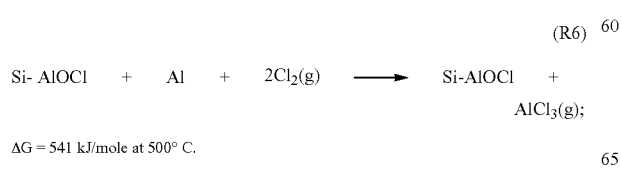

$Si\text{-}AlOCl + Al + 2Cl_2(g) \longrightarrow Si\text{-}AlOCl + AlCl_3(g);$ (R6)

$\Delta G = 541$ kJ/mole at 500° C.

Reaction R5 is highly endothermic and therefore reaction path through R5 is somewhat improbable; various tests carried out to react $SiO_2$ with $AlCl_3$ failed to achieve any measurable yield and the inventors found no evidence for $Cl_2$(g) during the tests. This reaction path is unlikely.

ii. Reactions between $AlCl_3$(g) and $SiO_2$ leading to formation of $SiCl_4$(g) and $Al_2O_3$:

$SiO_2 + 4/3 AlCl_3(g) \longrightarrow SiCl_4(g) + 2/3 Al_2O_3;$ (R7)

$\Delta G = 16$ kJ/mole at 500° C.

followed by reactions between $SiCl_4$(g) with Al leading to Si:

$SiCl_4(g) + 4/3 Al \longrightarrow Si + 4/3 AlCl_3;$ (R8)

$\Delta G = 160$ kJ/mole at 500° C.

Attempts to react $AlCl_3$ with $SiO_2$ according to (R7) at temperatures up to 600° C. were not successful. Moreover, processing according to the present invention is carried out at 1 atmosphere in an open reactor and therefore, if $SiCl_4$(g) was present, then there would be significant loss of $SiCl_4$(g) and consequently, reaction yields would be low. As stated before, reaction yields up to 99% are systematically obtained and the inventors saw no evidence of formation of $SiCl_4$(g).

Moreover, for reactions R7-R8 to conform with experimental evidence showing the by-product consisting of AlOCl, $Al_2O_3$ produced through R7 must re-react with $AlCl_3$ to form AlOCl:

$Al_2O_3(g) + AlCl_3 \longrightarrow 3 AlOCl$ (R9)

Attempts to gauge the efficacy of R9 at temperatures up to 600° C. showed no evidence of significant activities according to this reaction.

This reaction path appears unlikely.

iii. The third possible reaction path relies on a two-step scheme postulating short-range no-equilibrium reactions enabling mediated reactions between Al and $SiO_2$. According to this scheme, $AlCl_3$(g) first reacts with Al to form AlCl(g), and then AlCl(g) reacts with $SiO_2$ in the proximity of the reacting Al particulate where AlCl(g) was produced, leading to AlOCl:

$AlCl_3(g) + 2 Al \longrightarrow 3 AlCl(g)$ (R10)

$SiO_2 + 2 AlCl(g) \longrightarrow Si + 2AlOCl$ (R11)

Figure 2:
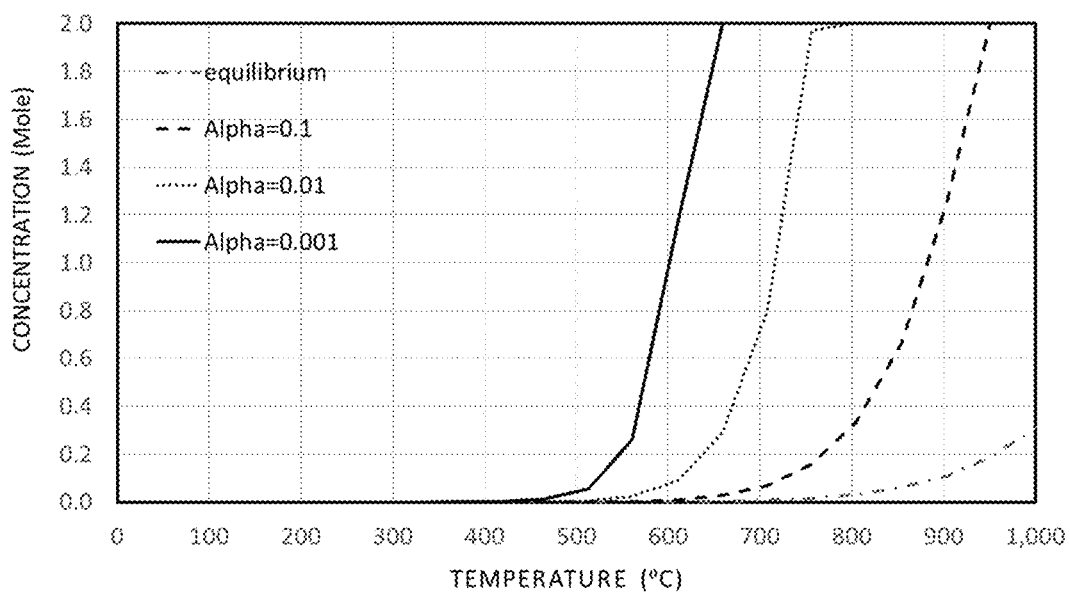
FIG. 2 shows calculated concentration of AlCl(g) at temperatures up to 1000° C. for various degrees of AlCl(g) depletion.

FIG. 1 shows the equilibrium composition for a mixture of Al—AlCl$_3$ at temperatures up to 1000° C. It can be seen there, that under normal equilibrium conditions, the concentration of AlCl(g) at 550° C. is negligible. However, if the vapour pressure of AlCl(g) was reduced due to depletion through reaction R11, then production of AlCl(g) would be significantly enhanced, enabling reaction R11 to proceed to completion. FIG. 2 shows results for numerical simulations carried out for a mixture of Al—AlCl$_3$ at temperatures up to 1000° C. with reduced AlCl(g) vapour pressures; it can be seen there that under such conditions, the equilibrium is tilted to the right with considerable amounts of AlCl(g) produced at temperatures down to less than 500° C. Furthermore, experimental results obtained by the inventors together with other experimental observations appear to support this third proposed reaction scheme as a likely reaction path:

- For pre-mixed reactants, the reaction yield does not deteriorate significantly when processing is carried out with no mixing. The week dependency of measured yields on mixing efficiency together with the high yields obtained can only be explained through mediated reactions b tween solid SiO$_2$ and solid Al involving gaseous species.
- SEM and EDS analyses for Si products obtained with starting SiO$_2$ fibres (8 micron diameter) suggest that the fibres are reduced to Si while keeping their general cylindrical shape. Formation of metallic silicon at the core of the fibre away from the surface could not have resulted from solid-solid reactions and suggests the presence of gaseous reactants capable of penetrating the porous Si fibre structure. If SiCl$_4$(g) was the intermediate gaseous compound, then the fibre would have lost its shape and the resulting Si particulates would be templated on the reducing Al particles rather than the glass fibre.
- As mentioned before, reaction yields up to 99% have been obtained, suggesting reaction rate are not limited by solid-solid reactions where physical contact between Al and SiO$_2$ is required. The reaction rate does not reduce significantly in time and therefore, it seems not to become limited by diffusion, most often seen for processing involving solid-solid reactions.

The above discussion does not exclude the possibility that there could be more complex reaction paths in the SiO$_2$—Al—AlCl$_3$ system. However, based on the basic analysis presented above, it appears that reaction path R15-R16 conforms with the experimental results and can be a mechanism for reducing the threshold reaction temperature and enabling low temperature reduction of SiO$_2$.

For embodiments involving SiO$_2$, the method of the present invention requires AlCl$_3$ to be in the gas phase with no formation of a molten AlCl$_3$ phase. Here, reactions in the SiO$_2$—Al—AlCl$_3$ occur at temperature in the range 450-600° C. with insignificant reactions below 450° C. and no reactions of whatsoever below 350° C. The high yield observed in the inventors' testing appears to be due to gas-solid reactions involving gaseous AlCl$_3$ and gaseous Al—Cl species. The presence of a liquid AlCl$_3$ phase can reduce the efficiency of the reactions as it becomes limited by the ability of molten AlCl$_3$ to diffuse through solid particulates to reach unreacted SiO$_2$ particulates and/or particulate core. Attempts to use liquid eutectic AlCl$_3$—NaCl as a source of AlCl$_3$ for reduction of SiO$_2$ resulted in much lower yields than observed with gaseous AlCl$_3$.

For all aspects and embodiments of the method, the AlCl$_3$ in the reaction vessel or reacting with the other reactants M$_c$O$_x$—Al must not be in a molten state resulting from pressure increases, wherein the vessel is closed and heated in order to induce melting of the AlCl$_3$. For all aspects and embodiments, it is preferable that reactions in the M$_c$O$_x$—Al—AlCl$_3$ according to the present disclosure are carried out in a vessel open to atmospheric pressure with no ability to build up pressure in the vessel.

Group III:

As indicated, Group III includes elements mostly with multiple oxides, that do not conform to the direct reaction path for Group I using AlCl$_3$(s) and Group II using gaseous AlCl$_3$(g). For Group III, the product is generally a composite comprising Al$_2$O$_3$ and reactions tend to occur at high temperatures where AlCl$_3$ is in a gaseous form.

For most elements in this group, reactions in the M$_c$O$_x$—Al—AlCl$_3$ system are highly exothermic and although it is possible for some elements to obtain AlOCl as the by-products, any loss of control can lead to formation of Al$_2$O$_3$, making it generally difficult to consistently obtain products with zero Al$_2$O$_3$ content.

For oxides in Group III, including TiO$_2$, Fe$_2$O$_3$, Sb$_2$O$_3$, WO$_3$, Ta$_2$O$_5$, Nb$_2$O$_3$, V$_2$O$_5$, Co$_3$O$_4$, Cr$_2$O$_3$ . . . , formation of products in the form of Mc-Al$_2$O$_3$ can be readily achieved through a reaction path using AlCl$_3$(g). However, reactions leading to formation of AlOCl by-product requires stepwise procedures to avoid thermal events leading to formation of Al$_2$O$_3$.

For the scheme using gaseous AlCl$_3$(g) and leading to Al$_2$O$_3$, the overall reaction is:

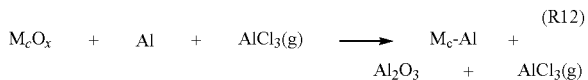

Here, the role of AlCl$_3$(g) is to facilitate reactions between M$_c$O$_x$ and Al, either through reactions similar to R1-R3 followed by disproportionation of AlOCl into Al$_2$O$_3$ and AlCl$_3$, or through other mechanisms such as intermediate reactions with Al and/or partial reduction of the base metal oxides to chlorides. The end result is that AlCl$_3$(g) is allowing for the threshold reaction temperature to reduce below 600° C. for most base metals and to 650° C.-800° C. for TiO$_2$, Co$_3$O$_4$ and Cr$_2$O$_3$.

For some elements of Group III, (i.e., TiO$_2$, Co$_3$O$_4$ and Cr$_2$O$_3$), processing at temperatures below 600° C. can lead to incomplete reduction with formation of suboxides or oxychlorides. For those three oxides, the threshold temperature for reactions leading to the metal is between 600° C. and 800° C., and the product is a composite based on M$_c$-Al$_2$O$_3$.

For elements with multiple oxides and stable oxychlorides such as Ti, Fe, Sb, W, Ta, Nb, V, Co, Cr . . . and including elements from Group I, (e.g., Fe$_2$O$_3$, WO$_3$ . . . ), reduction of the oxides to the base metals can involve formation of intermediates including base metal oxychloride (e.g., TiOCl, TaO$_2$Cl . . . ) and/or chlorides:

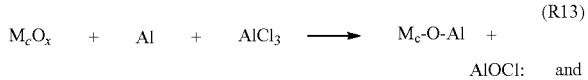

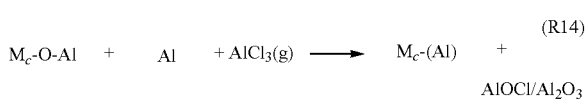

For example, for titanium, the reaction proceeds as follows:

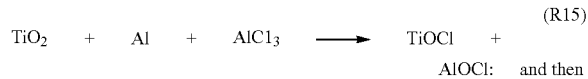
(R15)

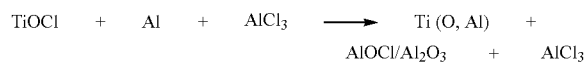
(R16)

Reaction R15 was observed to occur at temperatures above 150° C. and reaction R16 at temperatures above 500° C. The inventors find that for reaction R15 to lead to AlOCl, it is preferable that the amount of Al used corresponds to the stoichiometric amount as per R15. Starting with the total amount of Al needed for both R15 and R16 together leads to formation of $Al_2O_3$.

For most other base metal oxides in Group I and Group III, attempts to carry out reactions in a way similar to $SiO_2$ were not successful, and always led to formation of composite materials based on $M_c$-$Al_2O_3$.

Precursor Chemicals and Products

As stated before, key effects and advantages of the present invention arise because of the $AlCl_3$ reacting with the Al-$M_cO_x$ reactants and reducing the threshold reaction temperature. Discussion throughout this disclosure referring to reactions and mechanisms facilitating the role of $AlCl_3$ is only intended for highlighting various physical mechanisms involved and outlining aspects of the technology. This discussion is not intended to be comprehensive and/or to limit the present invention to any theory or mechanism of action.

Preferred metal oxide-containing precursors are oxides and suboxides of the base metals or a mixture thereof. Preferably, starting oxide-based precursors are in the form of a fine powders, flakes, fibres or particulates. Examples include $Fe_2O_3$ powder, NiO powder, CuO powder and ZnO powder and oxide mixtures such as $Fe_2O_3$—$Co_3O_4$—NiO. Other examples of suitable precursors include amorphous $SiO_2$ powder, quartz powder, silica nanopowder, porous silica powder, fumed silica, glass powder, glass flakes, borosilicate glass, natural mica, synthetic mica or any other composition based on $SiO_2$.

The particle size of the precursors can be between a few nanometres and several millimetres, depending on characteristics of required end-products. Htowever, small particle sizes less than 50 microns area preferred. Nanopowders with particle sizes less than 1 micron, and less than 100 nm, can be used, and usually, they lead to more effective reactions and better end-products. For example, silica nanopowders or fumed silica are preferred starting precursors to obtain silicon nanoparticles.

For Si, the inventors find that amorphous silica is better suited for the present reaction scheme as it can be obtained in finer forms than quartz, and therefore, it appears to react more readily than crystalline silica and almost always leads to formation of AlOCl by-products. Therefore, in a most preferred embodiment for Si, the starting $SiO_2$ precursors are amorphous.

The amount of base metal oxides reduced during processing can be between 0.1% and 100% of their starting weight. Remaining unreacted oxides and reducing agent are discharged as a part of products and may be separated in a post processing step if required.

The amount of the aluminium reductant (e.g. a reducing Al alloy) used depends on the starling precursor materials and the required composition of the cml products and can be lower or higher than the stoichiometric amount needed to reduce all the reducible starting precursor chemicals. In some embodiments, the amount of the aluminium reductant in the reaction mixture may be between 5 wt % and 500 wt %, and more preferably between 10 wt % and 200 wt %, and still more preferably between 50 wt % and 200 wt % of the weight of the metal oxide containing precursor.

Preferably, the Al is in the form of a powder or flakes with a particle size less than 50 microns in at least one dimension. More preferably, the Al has a particle size between 1 micron and 50 microns in at least one dimension.

The amount of $AlCl_3$ used may, in some embodiments, be between 1 wt % and 500 wt %, preferably, between 1 wt % and 200 wt % and more preferably between 10 wt %, and 200 wt %, and still more preferably between 50 wt % and 200 wt % of the weight of the metal oxide containing precursor.

The inventors discovered that for some metal oxides, the threshold reaction temperature required to induce reactions leading to reducing metal oxides depends on the amount of aluminium chloride used. For example, for ZnO, threshold reaction temperature can vary from less than 100° C. when a large amount of $AlCl_3$ is used to more than 500° C. if a small amount was used.

In any of the embodiments, the weight ratio of base metal oxides, the reducing Al alloy and the $AlCl_3$ is determined by a combination of factors, including the required composition of the end products and the stoichiometric requirements of reactions within the Mc-O—Al—Cl systems.

For embodiments using solid aluminium chlorides, the starting solid $AlCl_3$ is preferably in the form of a powder or granules with a particle size less than 5 mm. More preferably, the starting solid $AlCl_3(s)$ is in the form of a powder with a particle size less than 200 microns and more preferably less than 100 microns.

In most embodiments according to the method in the present disclosure, processing is carried out under a protective gas, preferably at atmosphere pressure, in an open reaction vessel. Excess amounts of aluminium chloride may be used and $AlCl_3(g)$ escaping or diffusing out of the reaction vessel may be condensed and returned to the reaction vessel during processing or collected in a dedicated vessel for later use or recycling. For processing according to R1-R3, excess gaseous aluminium escaping the reaction vessel may be condensed and returned to processing in the initial phase of reaction R1, and then condensed and collected in a dedicated vessel for later use in the final phase of the reaction towards the end of R3.

The method can be operated in a batch mode, a semi-continuous mode or in a full continuous mode, and $AlCl_3$ may be fed into the reaction zone/vessel as a solid powder that can either react with other precursors at low temperatures or sublimes into gaseous $AlCl_3(g)$ during processing. Alternatively, $AlCl_3$ may be fed into the reaction zone/vessel as gas stream through the reactants (e.g., fluidised bed) or in the reactant atmosphere.

For all aspects and embodiments of the method, residuals including aluminium chloride or oxychlorides, $Al_2O_3$, and residual unreacted oxides and sub-oxides, and other residual chlorides, and also unreacted Al, can be removed from the product in post processing steps using appropriate means, including washing, chemical dissolution and vacuum sublimation.

For example, AlOCl can be removed by washing in diluted HCl. If Al$_2$O$_3$ formed and was present in the products, they may remain part of the end-product either as an independent component such as in composites or as part of a compound/particulates where the aluminium oxide reacts physically or chemically with species resulting from the reduction reaction.

For most embodiments, processing temperatures are above 300° C. and usually the products are substantially free of aluminium chloride, and any aluminium chloride residuals would be due to contamination during discharge and/or handling. Preferably, products of the method contain residual solid AlCl$_3$(s) impurities less than 5 wt. % and preferably less than 1 wt %.

A person ordinarily skilled in the art of the invention would appreciate that the end-product may contain Al in the form of residual Al impurities or metal aluminides at levels between 0.01% and 70 weight (wt) %, and if needed, Al may be removed partially or entirely by various means including washing in chemicals such as diluted NaOH or diluted HCl.

The end products can include alloying additives, and additives can be in the form of pure elements, alloys, chlorides, oxides, nitrides, carbides, borides, sulphides or a combination thereof. Alloying additives can be introduced through various solid or gaseous precursors comprising the required product additives. Suitable additive precursors include oxides, chlorides and metallic powders, and examples of suitable additives include carbon black, calcium oxide, sodium bicarbonate, borates and silicates.

In embodiments wherein precursor materials include reactive additives, the end products can include compounds containing the alloying additive. For example, for additives of carbon, boron, oxygen and nitrogen, respectively the products can comprise carbides, borides, oxides and nitrides.

Preferred Embodiments

As discussed, reactions in the M$_c$O$_x$—Al—AlCl$_3$ can result in significant exothermic energy release with the ability to raise the reactant temperature to more than 1500° C., and then hamper the quality of the products; for example, increasing reactant temperature above 700° C. can trigger uncontrollable direct reactions between M$_c$O$_x$ and Al leading to formation of non-uniform compositions comprising Al$_2$O$_3$. Also, if the temperature of the reactants increases above the melting points of the base metal and/or Al, there can result formation of large particulates/dross of M$_c$-Al$_2$O$_3$. The present invention advantageously overcomes these problems of the art and includes procedures for controlling exothermic heat generation and maintain the temperature at levels suitable for production of materials with uniform and acceptable characteristics. Reaction rates within the M$_c$O$_x$—Al—AlCl$_3$(g) system are controlled though a combination of mechanisms including controlled feed rate for the reactants, mixing with pre-processed products and external heat management.

It is preferable that the method is carried out with gradual feeding of at least the Al and/or the AlCl$_3$, so that exothermic energy release is moderated, allowing for efficient thermal management of the reactants; for all example aspects and forms and embodiments, the method includes means for managing exothermic heat generation and maintaining the reactant and reactor temperature at a safe level.

In a preferred embodiment, the method includes:

gradually feeding reactants of precursor chemicals based on the base metal oxides and a reducing Al alloy into a reaction vessel set at a temperature T$_1$ above a certain threshold reaction temperature below 800° C. and preferably below 650° C.; and mixing and reacting the reactants in the presence of aluminium chlorides leading to a product based on Si, Zn, Cu, Fe, Ni, Sn, Sb, Mo, W, Ta, Nb, V, Ti, Co, Cr, In, Ag, Mn, Pt, Pd, Zr, Rh, Ru, Os and Re, mixed with a by-product of AlOCl or Al$_2$O$_3$; and wherein T$_1$ is below 600° C., and preferably between 180° C. and 600° C., and more preferably at between 160° C. and 600° C., and still more preferably at temperatures between 200° C. and 600° C., and still more preferably at temperatures between 400° C. and 600° C.; and wherein the vessel contains amounts of processed reactants; and wherein AlCl$_3$ is in solid form or a gaseous form; and where aluminium chloride is provided as a solid it may be provided together with the solid Al powder as a pre-mixed mixture; and optionally separating the by-product and produce an end-product based on the base metals.

Figure 3:
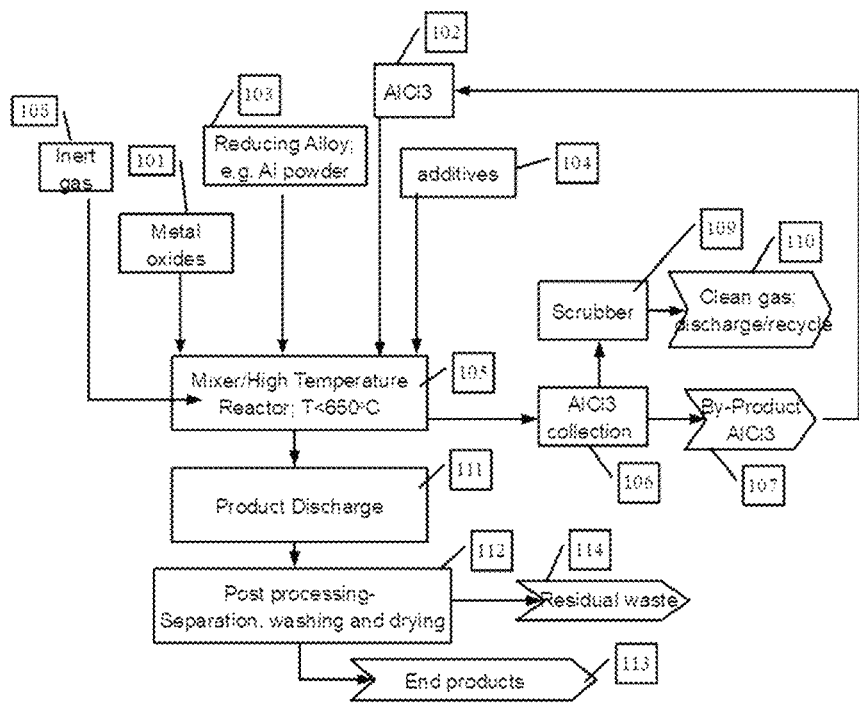
FIG. 3 shows a process schematic for one example embodiment illustrating steps for reducing metal oxides with Al in the presence of $AlCl_3$.

FIG. 3 is a schematic diagram illustrating processing steps for this preferred embodiment. Precursor powders of base metal oxides (101), an AlCl$_3$ powder (102) and Al powder (103), and alloying additives (104) are fed into a reaction vessel (105) equipped with a mixer (not shown), set at a temperature T$_1$ below 650° C., and preferably below 600° C.

The precursor powders are continuously mixed for a certain residence time t$_1$, leading to formation of a solid product based on the base metals, solid AlOCl/Al$_2$O$_3$, and of a gaseous AlCl$_3$ by-products. Gaseous AlCl$_3$(g) is condensed and collected in a dedicated vessel (106). A part or all the aluminium chlorides may be recycled through (107). All processing steps area preferably carried out under an inert gas or a non-fully reactive gas (e.g., Ar, CO$_2$, N$_2$, Ar—O$_2$ ... ) (108). At the exit of the by-product collection step, the gas is cleaned in a scrubber (109) before discharging into the atmosphere or recycling (110).

Other by-products of AlOCl and/or Al$_2$O$_3$ are discharged with the products (111). The products are then optionally post processed as needed (112) to separate metallic products from undesired residuals precursors (e.g. Al and unreacted metal oxides) and by-products (e.g. AlOCl), leading to an end-product (113). Waste (114) is processed and stored separately.

Reactants are arranged in separate streams depending on chemical compatibility, but it is preferred not to premix reactants which have the potential to react exothermically. For example, the aluminum powder (103) is compatible with the aluminium chloride (102) and may be mixed in a pre-mixing step and then fed together into the reaction zone/reaction vessel (105). Other precursors such as the base metal oxide(s) (101) may be mixed with other compatible such as additives (104). Mixing and preparation of the precursor materials is preferably carried out under a protective atmosphere.

The reaction vessel may be holding reactor vessel equipped with a mixer and operated in a batch mode, a semi-batch mode or in a continuous mode. One example of a suitable vessel is a fluidized bed system.

In one embodiment, a mixture of base metal oxides and Al are gradually fed into a reaction vessel at temperatures up to 650° C. in an atmosphere comprising gaseous AlCl$_3$ to induce reduction reactions leading to formation of powder products based on one or more of the base metals.

In all embodiments of the method, the amount of AlCl$_3$ provided to react with the M$_c$O$_x$—Al mixture can be regulated to suit the processing requirements and control reaction rate and reaction kinetics. In some embodiments, the aluminium chloride is passed as a gas stream over the $M_cO_x$-based precursor/Al mixture, as a pure $AlCl_3$ gas or as a carrier gas/$AlCl_3$ mixture (e.g., $N_2$/$AlCl_3$, or Ar/$AlCl_3$). In one embodiment, the aluminium chloride is passed through the metal oxides/Al mixture as per configurations in fluidised bed systems.

In one preferred embodiment, there is provided a stepwise method for production of metallic powders based on Zn, Cu, Fe, Ni, Sn, Sb, Mo, W, Ta, Nb, V, Ti, Co, Cr, In, Ag, Mn, Pt, Pd, Zr, Rh, Ru, Os and Re, wherein:

Step 1: gradually reacting a mixture comprising powders of metal oxides based on one or more of the base metals with a reducing Al agent in the presence of aluminium chloride at a temperature $T_1$ between 150° C. and 500° C. for a certain residence time $t_1$, leading to formation of intermediate products comprising $AlOCl/Al_2O_3$; and Step 2: gradually reacting the resulting intermediate products with Al and $AlCl_3$ at a temperature $T_2$ between 300° C. and a maximum temperature $T_{max}$ for a certain residence time $t_2$, leading to formation of products comprising compounds based on the base metals and a by-product of AlOCl or $Al_2O_3$ ($M_c$-$AlOCl/Al_2O_3$); $T_{max}$ is below 800° C., and preferably below 650° C. and more preferably below 600° C. and still more preferably between 300° C. and 600° C. and optionally processing the $M_c$-$AlOCl/Al_2O_3$ mixture to separate the by-product.

Maximum processing temperature $T_{max}$ is preferably below the melting point of Al and is determined by factors including the kinetic banner of react ions between the precursor materials, the aluminium chloride and the reducing Al alloy. However, the maximum temperature can exceed the melting temperature of Al in a post processing step where excess Al is required in the end-product and Al is required to diffuse through the bulk of the product. Also, $T_{max}$ is preferably higher than the threshold reaction temperature.

As outlined before, threshold reaction temperatures are different for different oxide systems and can also depend on the amount of $AlCl_3$ and Al used; for example, typically, for ZnO and CuO, reactions can start at temperatures around 100° C. For $Fe_2O_3$, reactions initiate at around 300° C. For $SiO_2$, reactions can start at temperatures around 450° C. but are more effective at 500-550° C. For NiO, the temperature is between 350° C. and 450° C. and for $TiO_2$, the threshold temperature leading to the metal is above 650° C.

Figure 4:
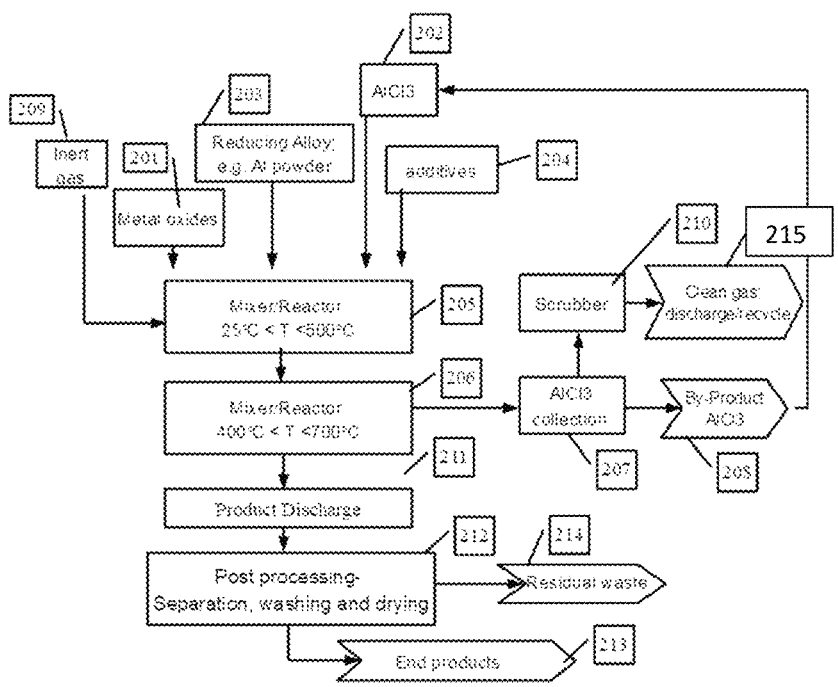
FIG. 4 shows a process schematic illustrating processing steps for a further example embodiment for two-step reduction of metal oxides with Al.

FIG. 4 is an example schematic diagram illustrating processing steps for one preferred embodiment for production of a powdery metallic systems starting from metal oxides and Al but with processing carried out through two processing stages. This arrangement may be suitable for a number of metals (e.g., Cu and Zn). Here, in a first processing step, base metal oxides (201) are first reacted with $AlCl_3$ (202) and Al (203), and optionally alloying additives (204) at temperatures between 25° C. and 500° C. (205) to produce intermediates based on the $M_c$-O—Al—Cl system. In a second processing step (206), the resulting intermediates are reacted with Al (201) and $AlCl_3$ to complete the reaction. AlCl3 (202) and Al (203) may be directly fed into (206); the corresponding direct link is not shown in FIG. 4.

Gaseous $AlCl_3$ by-products are condensed away from the solid reactants and collected in a dedicated vessel (207). A part or all the aluminum chlorides may be recycled through (208 and 202). All processing steps are preferably carried out under a protective gas (e.g. Ar, $CO_2$, $N_2$ . . . ) (209) and at the exit of the by-product collection step, the gas is cleaned in a scrubber (210) before discharging into the atmosphere or recycled (215).

AlOCl and/or $Al_2O_3$ produced during the process are discharged together with the products (211). The product is then optionally post processed 212 as needed to separate metallic products (213) from undesired residuals precursors (e.g., Al and unreacted metal oxides) and by-products leading to an end-product.

Residual waste (214) is stored separately for further processing or disposal.

In all embodiments, the reactants can be continuously mixed at temperatures up to 650° C. to complete the reduction reaction and form a product comprising metallic systems or metallic suboxides. In all embodiments, the aluminium chloride may be provided to the reaction zone/vessel in the form of a solid that reacts directly with other reactants, or in the form of a solid that then sublimes due to heat, or he it can be introduced directly in a vapour form. In all embodiments, the $M_cO_x$ precursors may be provided in a batch form or fed gradually. In most preferred embodiments, the Al is fed gradually. In all forms and embodiments, the reaction vessel can contain amounts of processed reactants or pre-processed reactants, and the method includes the step of mixing fed reactants with materials already present in the vessel.

In one embodiment for continuous operation, a mixture of the precursor metal oxides, the aluminium chloride and the reducing Al alloy are processed in a reaction vessel at temperatures, increasing in a continuous manner or in a number of incremental steps from a temperature $T_1$ at the point where the mixture enters the reactor to a temperature $T_{max}$ below 800° C. and preferably below 600° C., before the resulting products are cooled and discharged out of the reactor. Preferably, $T_1$ is above 25° C. and preferably above 100° C. and still more preferably above 180° C. The resulting products are then cooled and discharged for further processing.

In one preferred embodiment, control of the exothermic heat generation is done by mixing the reactants with previously obtained products or with pre-processed reactants which can act as both a thermal load absorbing heat generated by the reaction and a control agent limiting close-range contact between the reducible $M_cO_x$ reactants and the reducing Al powder and therefore moderating reaction rates.

In one other preferred form of this embodiment for controlling exothermic energy release and moderating reactant temperature, base metal oxides and a reducing Al alloy are gradually fed into a reaction vessel at temperatures between 160° C. and 600° C. and preferably between 200° C. and 600° C., and gradually mixed and reacted in the presence of $AlCl_3$ and in the presence of the resulting base metal products while controlling the reactant feed rate to maintain the reactants at a temperature preferably below 650° C. and more preferably below 600° C. This results in the formation of a solid base metal powder product which may include AlOCl, in addition to residual metal chlorides, residual unreacted base metal oxides and residual reducing Al, and possibly $Al_3O_3$ depending on the reaction conditions.

In one embodiment, NaCl is added to the reactant mixture and this has the effect of reacting with $AlCl_3$ to form an intermediate NaCl—$AlCl_3$ eutectic compound and retain the $AlCl_3$ in a liquid form at pressures below 1.2 bars to be available for reacting with the $SiO_2$-based precursor and the Al reactants at temperatures up to 550° C. The ratio of NaCl to $AlCl_3$ can be between 25 wt % and 200 wt %. The role of the NaCl is to form an intermediate compound which helps retain the $AlCl_3$ within the reactants in a condensed form at temperatures up to 600° C. Where NaCl is added, the reactants mixture is processed according to any of the foregoing or forthcoming embodiments in the present disclosure.

In one embodiment for partial reduction of the precursor metal oxide, the method comprises the step of reacting a mixture of a $M_cO_x$-based substrate powder and a sub-stoichiometric amount of Al in an atmosphere comprising gaseous $AlCl_3$ to induce reduction reactions leading to reducing a part of the substrate and forming a metallic coating on the substrate surface. The substrate can be in the form of flakes, powder or fibres.

In one preferred embodiment for production of silicon powders, a stream of precursor $SiO_2$ powder and a stream consisting of a mixture of Al—$AlCl_3$ powder are gradually fed into a reaction vessel pre-heated at temperatures between 400° C. and 600° C. and preferably between 450° C. and 600° C. Processing is carried out under a non-reactive protective gas in a vessel at atmospheric pressure. For this embodiment, the reaction product is a mixture of Si powder and AlOCl. The product mixture is washed in diluted HCl to separate the metallic Si powder. In one form of this embodiment, the precursor $SiO_2$ powder is a silica nanopowder and the product is a nanopowder of Si. In one other form, the precursor $SiO_2$ powder is a powder of fumed silica and the product is a nanopowder of Si. In other forms, the precursor $SiO_2$ powder is fumed silica.

Figure 5:
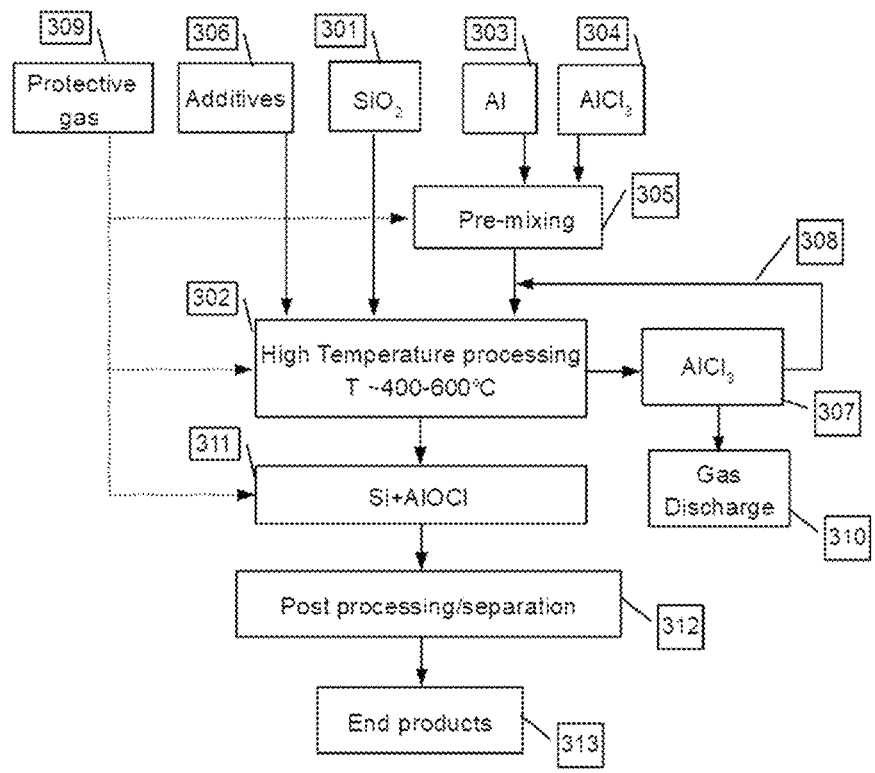
FIG. 5 shows a process schematic for one example embodiment illustrating steps for reducing a $SiO_2$ with Al in the presence of gaseous $AlCl_3$.

FIG. 5 is a schematic diagram illustrating processing steps for one preferred embodiment for reducing $SiO_2$ precursors with Al—$AlCl_3$. For this embodiment, an $SiO_2$ precursor powders (301) is fed into a reactor vessel (302) either in one batch or in a gradual way. Al powder (303) and $AlCl_3$ powder (304), are pre-mixed (305) and then gradually fed into the reactor vessel (302) equipped with a mixer (not shown) and set at a processing temperature $T_1$ higher than threshold reaction temperature required for reducing the $SiO_2$. Alloying additives (306) may be fed separately or with other precursors depending on reactivity and compatibility.

Reactants in (302) are continuously mixed for a certain residence time $t_1$, leading to formation of a solid product comprising metallic Si-based compounds and solid AlOCl by-products. Solid $AlCl_3$ fed into the reactor vessel in a solid form (as a part of the mixture Al—$AlCl_3$) sublimes to form gaseous $AlCl_3$, and a part of which reacts with the Al and $SiO_2$ in the reactor to form AlOCl. Another part of the gaseous $AlCl_3$ escapes or diffuses out of (302) and is condensed and collected in a dedicated vessel (307). A part or all the aluminium chlorides may be recycled through (308). All processing steps are preferably carried out under an inert gas or a non-fully reactive gas (e.g., Ar, $CO_2$, $N_2$ ... ) (309). At the exit of the by-product collection step, the gas is cleaned in a scrubber (310) before discharging into the atmosphere or recycling.

Solid reaction products including Si powder and AlOCl by-products, together with any other solid residuals (e.g., $Al_2O_3$, additive precursors ... ) are discharged through (311). The reaction products (311) are then optionally post processed as needed (312) to separate metallic products from undesired residuals precursor (e.g., Al and unreacted $SiO_2$) and by-products leading to an end-product (313). Waste from the separation step (312) is processed and stored separately.

In one form of this embodiment where the end product include alloying additives, precursor chemicals for the additives are included with the starting precursors. Additives can be based on Zn, Cu, Fe, Ni, Co, Cr, Mo, Sn, Ti, In, Sb, Ag, V, Mn, Pt, Pd, Ta, Zr, Nb, Rh, Ru, Os, Re, C, B and W. An example according to this embodiment is production of Si—Ag compositions. Here, AgCl is added to the precursors or the reactants at any point during processing and processed together with other reactants according to any of the foregoing or forthcoming embodiments. The final product is in the form of Si particulates coated with Ag.

In one embodiment, the precursor metal oxides are mixed with metal carbides or graphite and then reacted with Al—$AlCl_3$ according to any of the foregoing or forthcoming embodiments. In one form of this embodiment, the precursor metal oxide is based on $SiO_2$ and the end-product comprises graphite, carbon-based compounds and silicon.

In one form of this embodiment for production of Si-graphite composites, a graphite powder is co-milled with $SiO_2$, and the resulting mixture is reacted with Al—$AlCl_3$ according to any of the foregoing or forthcoming embodiments. In one form of this embodiment, a graphite powder is co-milled with $SiO_2$ and $AlCl_3$, and the resulting mixture is reacted with Al or Al—$AlCl_3$ according to any of the foregoing or forthcoming embodiments. In another form, a graphite powder is co-milled with $SiO_2$ and $AlCl_3$ and Al, and the resulting mixture is reacted according to any of the foregoing or forthcoming embodiments. The resulting product is a of graphitic sheets coated with Si mixed with AlOCl. The AlOCl is removed by washing in diluted HCl. The end-product consist of graphite flakes or powder coated with silicon.

In a most preferred embodiment for production of silicon-based materials, there is provided a method for producing powders based on Si, wherein:

the composition of the solid precursor powder can be any of: a multi-components powder comprising $SiO_2$, a pure $SiO_2$, an $SiO_2$ nanopowder, fumed silica, amorphous silica, quartz powder, glass powder, glass flakes, borosilicate glass powder or flakes, mica, synthetic mica or any other composition based on $SiO_2$; and Step 1: the particle size of the precursor silica-based powder is between a few nanometres and several hundred microns in at least one dimension; and the said SiO2-based precursor powder is reacted with Al and gaseous AlCl3(g) to produce a powder product; and the by-product is AlOCl, and the product is a mixture of silicon-based powder and solid AlOCl and residual Al; and the product from Step 1 are substantially free of aluminium chlorides; and preferably the product contain residual solid $AlCl_3$(s) impurities less than 5 wt %; and the products can be in the form of any one or a mixture of silicon powder, silicon nanopowder with a particle size less than 1 micron, pure silicon materials, a powder based on silicon monoxide SiO or $SiO_x$ where x is between 0.2 and 1.8, silicon-based powder with an oxygen content between 0.01 and 50 wt %, and silicon-coated particulates; and Step 2: optionally processing products from Step 1 to remove AlOCl by-products and/or residual Al to produce an end-product based on Si.

In one preferred embodiment for partial reduction of precursors based on $SiO_2$ and producing Si coated substrates, $SiO_2$-based precursors are reacted with a sub-stoichiometric amount of Al in the presence of gaseous $AlCl_3$. The product is then in the form of an $SiO_2$-based substrate coated with Si. The $SiO_2$ precursors can be in the form of particulates such as powder, flakes or fibres. Metallic coating on the particulate surface may be continuous or patchy and may cover the whole or a part of the particulate surface.

When the particulates are in the form of flakes, the coating can be reflective and then the particulates can be used in applications such as pigments, and here, our claims extend to both process and products. In other embodiments, the coated particulates can be further reacted with other precursor chemicals wherein metallic Si plays the role of a reducing agent.

In one form of this embodiment, AgCl additives are included with the precursor chemical and the end-product is an $SiO_2$-Substrate coated with Si—Ag or Ag, depending on the amount of Al and AgCl used and the required characteristics of the end-product.

In one embodiment, for production of silicon-based products, the precursor oxide powder includes glass powder or glass flakes, fumed silica, silica nanopowders, glass hub lea, and the product includes metallic silicon or metal silicides, in one form of this embodiment, the precursor oxides are in the form of flakes and the product is a powder with flake like morphology. In another form, the precursor powder includes fibres, and the product is a powder with fibre like morphology.

In one embodiment, the method includes the additional step wherein metallic silicon produced according to any of the foregoing or forthcoming embodiments is further reacted with chlorides or oxides of the base metals Zn, Cu, Fe, Ni, Co, Cr, Mo, Sn, Ti, In, Sb, Ag, V, Mn, Pt, Pd, Ta, Zr, Nb, Rh, Ru, Os, Re and W, to produce compounds in the form of $Si/SiO_2$ particulates coated with base metals or in the form of pure base metal compounds. In one form of this embodiment, the said metallic silicon is used as a part of an as-produced mixture comprising AlOCl. In another form, the said metallic silicon is used after removing the AlOCl by-product.

According to this embodiment, there is provided a stepwise method for production of powder based on Si, Zn, Cu, Fe, Ni, Co, Cr, Mo, Sn, Ti, In, Sb, Ag, V, Mn, Pt, Pd, Ta, Zr, Nb, Rh, Ru, Os, Re and W, wherein:

in a first step, $SiO_2$ is reduced with Al and $AlCl_3$ according to any of the foregoing or forthcoming embodiments of the method, to produce an intermediate powder comprising metallic Si and a by-product; and in a second step, the intermediate powder is optionally processed to remove the by-products; and in a third step, powder obtained at the end of the first step or the second step is reacted with base metal precursors at temperatures between 100° C. and 800° C. to form a powder product based on Si, B, C, Zn, Cu, Fe, Ni, Co, Cr, Mo, Sn, Ti, In, Sb, Ag, V, Mn, Pt, Pd, Ta, Zr, Nb, Rh, Ru, Os, Re and W; and wherein metallic Si in powder form obtained at the end of the first step or the second step is the reducing agent for the base metal precursors; and the base metal precursors are chlorides or oxides of the base metals; and $AlCl_3(s)$ or $AlCl_3(g)$ are added to the reactants in said third step; and the by-products from third step include $SiCl_4(g)$; and the powder product from said third step are optionally processed to remove by-products and residual precursors; and the final powder product is in the form of:
   metallic Si-based particulates coated with a coating based on one or more of B, C, Zn, Cu, Fe, Ni, Co, Cr, Mo, Sn, Ti, In, Sb, Ag, V, Mn, Pt, Pd, Ta, Zr, Nb, Rh, Ru, Os, Re and W; or
   $SiO_2$-based particulates coated with a coating based on one or more of B, C, Zn, Cu, Fe, Ni, Co, Cr, Mo, Sn, Ti, In, Sb, Ag, V, Mn, Pt, Pd, Ta, Zr, Nb, Rh, Ru, Os, Re and W; or
   particulates based on the base metals wherein metallic silicon produced in the said first step has been consumed by reactions in said third step.

The advantages of using this embodiment for production of base metal powders include the ability to produce base metal nanoparticles using Si nanoparticles produced in said first step as a reducing agent and as templates for low-temperature synthesis of other compositions. For example, Ag-based nanoparticles are produced by reducing AgCl at temperatures between 300° C. and 500° C. with silicon nanoparticles produced according to the present method. Adding $AlCl_3$ to the reactant mixture allows the reaction to occur at low temperatures below 500° C., and then the product can be in the form of Si particles coated with Ag or as pure Ag nanoparticles, depending on the amount of Si in the starting materials and the amount of AgCl used.

The amounts precursor chemicals including base metal chemicals are determined according to the required composition of the end-product. For example, to obtain Si powder coated with Ag, the amount of the starting $SiO_2$, Al and $AlCl_3$ must be such that $AlCl_3$ is supplied in over-stoichiometric amounts. Also, the amount of AgCl used must be so that the amount of Si used for reducing the AgCl leading to gaseous $SiCl_4(g)$ is small, leaving behind Si particulates coated with Ag. In one other form for production of pure Ag nanoparticles, the amount of AgCl must be so that the total amount of available Si is consumed in the process. In another configuration, the amount of $SiO_2$—Al—$AlCl_3$ used is such that the intermediate products consist of particulates consisting of $SiO_2$ core with a top layer of Si. Here, reacting the intermediates with AgCl can lead to $SiO_2$ particles coated with Ag. At the end of the AgCl reduction cycle, AlOCl by-products if present and residual AgCl if present are removed using appropriate means.

Other advantages for the last embodiment of the method for production of powders based on Si, Zn, Cu, Fe, Ni, Co, Cr, Mo, Sn, Ti, In, Sb, Ag, V, Mn, Pt, Pd, Ta, Zr, Nb, Rh, Ru, Os, Re and W include the ability to produce compositions based on Si and the base metals while suppressing or minimising formation of metal silicides. Because the method in this embodiment provides means for reacting base metal chlorides and oxides with Si at low temperatures, formation of metal silicides may be entirely supressed or minimised when processing temperatures are below the temperature required to form silicides. The inventors rind that using $AlCl_3$ in combination with base metal precursors (e.g., base AgCl) reduces the threshold reaction temperature required for reacting the base metal precursors with Si and allows the reaction to occur at low temperatures below temperatures required for formation of metal silicides.

For example, Si—Cu compositions can be produced by reducing a mixture of $CuCl_2$—Si at temperatures around 400° C. with silicon nanoparticles produced using the present method. Using $CuCl_2$—$AlCl_3$ instead of $CuCl_2$ reduces the reaction temperature to around 200° C., and then the product can be in the form of Si particles coated with Cu or in the form of pure Cu nanoparticles.

Other examples illustrating this embodiment are presented further in this disclosure.

Figure 6:
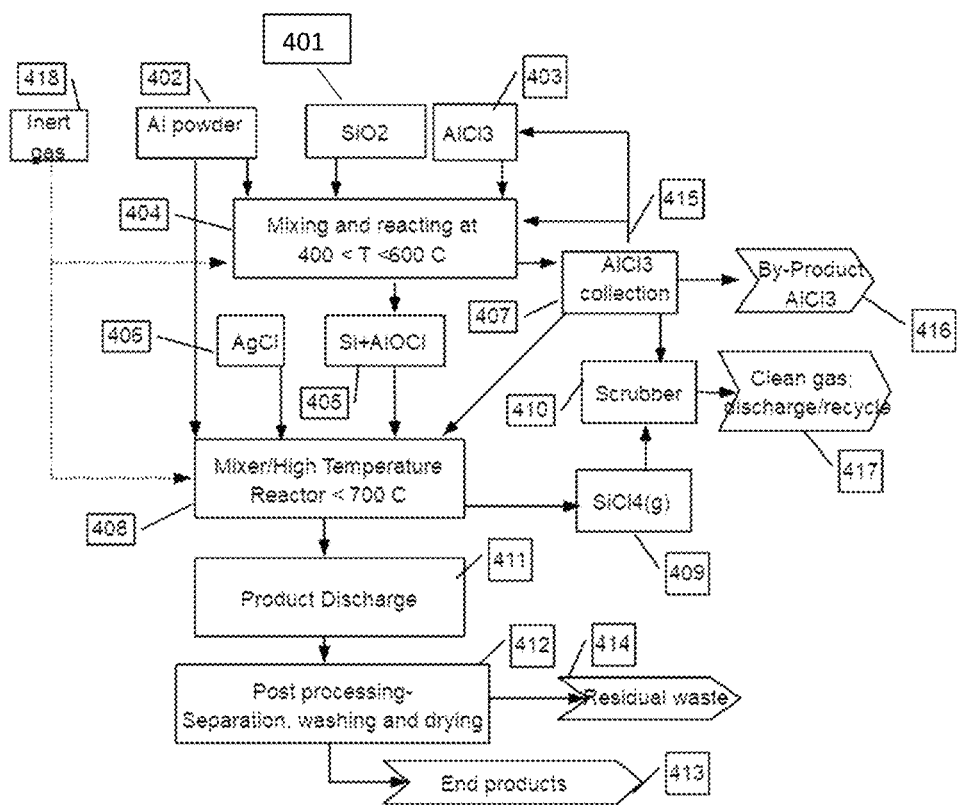
FIG. 6 is a schematic diagram illustrating processing steps for one preferred embodiment for production of a Si powders coated with Ag.

FIG. 6 is a schematic diagram illustrating processing steps for one preferred embodiment for production of a Si powders coated with Ag. This arrangement is suitable for most other base metals (e.g. Cu, Ni . . . ). Here, $SiO_2$ (401) is first reacted with Al (402), $AlCl_3$ (403) in reactor vessel (404) as described before for example in FIG. 5, leading to an intermediate product comprising a mixture of Si and AlOCl (405). The intermediate products (405) are then reacted together with AgCl (406) and AlCl$_3$ (407) in a reactor vessel (408) at temperatures between 180° C. and a maximum temperature below 750° C. The maximum temperature depends on the additives (406)—for AgCl, reaction temperature is between 300° C. and 500° C. AlCl$_3$ (407) can also be recycled (415) back to reactor vessel (404) and AlCl$_3$ (403), or recovered as a by-product (416) for subsequent use. The resulting by-products is SiCl$_4$(g) (409) is driven out of the reactor and processed through a scrubber (410) or stored for recycling (417). The powder product (411) is then discharged for post-processing (412). For example, in one embodiment, the powder may be first washed in H$_2$O—HCl and filtered to remove the AlOCl, and then further washed with NH$_4$OH to remove residual AgCl. The resulting powder (413) consist of particulates with Si—Ag based composition. All high temperature processing steps are carried out under an inert atmosphere. Residual waste (414) is stored separately for further processing or disposal.

In one embodiment, the method includes the additional step wherein products resulting from the method according to any of the foregoing or forthcoming embodiments are heated at temperatures up to 1000° C. to induce changes in the phase composition of the products. This embodiment is useful for cases where the end-product has a high aluminium content and for other cases where removal of residual reactants requires high temperature processing. For example, for compositions requiring the presence of a large amount of Al within the end products, the higher temperature would enhance diffusion of Al into other components of the method products.

In one form of this embodiment, the solid mixture of precursor metal oxides, the aluminium chloride and the reducing Al alloy are first processed in a first stage at temperatures $T_1$ between 100° C. and below 600° C. for a certain residence time $t_1$, and then the resulting products are processed through a second stage at temperatures between 200° C. and 800° C., for a certain residence time $t_2$ to remove residual species such as residual metal chlorides, leading a final product.

For all embodiments, preferably solid reactants including the base metal oxides and the reducing Al alloy are continuously mixed to maximise contact between the solid reactants and improve reaction yield.

In all embodiments, additives can be in the form of pure elements, alloys, oxides, nitrides, carbides, borides, sulphides or a combination thereof, silicates, boron powder and silicon powder.

In one embodiment, wherein the by-product is AlOCl, the AlOCl is separated from the metallic powder product by washing in a solvent suitable for dissolving AlOCl, and then separating the solid powder product.

In embodiments wherein precursor materials include reactive additives, the products would include compounds based on the base metals and the additives. For example, for additives of carbon, silicon, boron, oxygen and nitrogen, respectively the products can comprise carbides, suicides, borides, oxides and nitrides.

Mixing and stirring of the reactants can help increase contact between the various components of the mixture and optimise product and maximise reaction yield. Stirring helps bring reducible precursor chemicals and unsaturated species produced during processing into contact with the reducing agent and then those species can react or disproportionate, and hence help improve the quality of the product. In a preferred embodiment, process conditions are arranged to maximise reactions between $M_cO_x$ and Al—AlCl$_3$ through efficient mixing of the reactants.

For all aspects and embodiments of the method, the pressure in the reaction vessel must be below 1.5 atm, and preferably below 1.2 atm and more preferably the vessel is kept under a protective gas at a pressure around 1 atm and in open communication with external environment at 1 atm.

In embodiment for production of metal suboxides, base metal oxides based on Zn, Cu, Fe, Ni, Sn, Sb, Mo, W, Ta, Nb, V, Ti, Co, Cr, In, Ag, Mn, Pt, Pd, Zr, Rh, Ru, Os and Re, are reacted with Al powder and AlCl$_3$ at temperatures between 100° C. and 500° C. and preferably at temperatures between 100° C. and 300° C. to produce base metal suboxides. The weight ratio of $M_cO_x$/Al/AlCl$_3$ is in the range 100%/1%/1% to 100%/500%/500% of the stoichiometric amounts needed to reduce the $M_cO_x$ to $M_c$. The product is a metal suboxide, wherein the amount of oxygen in the end product is between 0.01% and 99.999% of the oxygen in the starting $M_cO_x$ oxides.

In one form of this embodiment for production of blue titanium oxides, TiO$_2$ is reacted with Al and AlCl$_3$ at temperatures between 100° C. and 300° C., leading to a product in the form of blue coloured TiO$_2$, consisting of TiO$_2$ with electronic vacancies resulting from stripping of some oxygen from the starting oxide by the Al and AlCl$_3$ mixture. For this form, the amount of Al/AlCl$_3$ is between 5%/5% and 50%/100% of the amount needed to reduce the TiO$_2$ to Ti according to reactions R15-R16.

The precursor chemicals can be arranged in two or more materials streams that are fed together or independently into the reaction vessel and reacted to produce a powder product. In one variation of this form, the reactants can be processed at multiple temperatures for various processing times to optimise processing conditions and produce materials with desired characteristics.

In one embodiment, the reactants are introduced through several materials streams, including a stream comprising a mixture of the reducing alloy and the aluminium chloride. In one form of this embodiment, this mixture is produced through co-milling.

In another embodiment, the materials stream includes, a stream comprising a mixture of precursor metal oxides and aluminium chloride. In one form of this embodiment, this mixture is produced through co-milling.

In one embodiment, the precursor metal oxides are milled to reduce their particle size before reacting. In one form of this embodiment, the precursor metal oxides are co-milled with the aluminium chloride.

In any of the embodiments, the process may be carried out in an inert gas, or in a non-reactive gas or in a mixture of non-reactive gas and a reactive gas; examples of adequate gases include Ar, N$_2$ or CO$_2$. In one embodiment, the gas stream consists of a mixture of Ar and reactive components such as NH$_3$.

For embodiments involving use of reactive gases, the reactive gases are preferably introduced at a physical location in the reactor vessel or at a time after reactions leading to metallic product have been completed.

In one embodiment, a stream of gas is arranged to flow in a direction away from the reactants and the solid reaction products.

In one embodiment, the method comprises an additional step wherein products obtained at the end of the process are reacted with further gaseous reactants at temperatures between 25° C. and 850° C. Gaseous reactants include gases containing reactive elements such as oxygen, nitrogen, boon and carbon. For example, the products may be heated in a stream of CH$_4$ to produce a $M_c$-C based compounds.

In one example of this embodiment, the reactive gas includes nitrogen such as $NH_3$ and the product is made of base metal nitride and the amount of nitrogen in the reactive gas and the processing times of the reactants are adjusted to control the amount of nitrogen in the product. The amount of nitrogen in the product can be between 0 and 100% of the amount corresponding to the highest valence nitride of $M_c$ or of the base metal in the powder product.

In one other example, the reactive gas includes carbon such as $CH_4$ and the product is made of base metal carbide and the amount of carbon in the reactive gas and the processing time of the reactants are adjusted to control the amount of carbon in the product.

In one embodiment, there is provided a method for production of skeletal materials based on the base metals, wherein one or more precursor base metals are reduced with Al in the presence of aluminium chloride at temperatures below 800° C. and preferably below 600° C. to form a product comprising intermetallic base metal aluminides. The method of this aspect includes a post processing step wherein the intermetallic base metal aluminides are reacted with a chemical (e.g., NaOH) to remove the Al and obtain a skeletal base metal product with a large surface area.

The invention extends to materials made using the method in all its embodiments and forms, without being limited by the examples provided herein by way of illustration. Materials produced by preferred forms of the invention described here may have unique characteristics that may not be obtained using prior art methods. Specific example properties may include the ability to produce nanostructured product with large area and compositions usually unachievable with conventional techniques.

One example of materials with unique characteristics obtained using current technology is nanocrystalline silicon with metallic additives for use in Li-ion batteries. Such materials are characterised by large surface area and superior conductivity resulting from addition of base metal additives. Such materials and their use are claimed as a part of the present invention.

Crystalline silicon powders produced according to the present method have irregular particular shape with a panicle size range from 10 nm to 500 nm and include Al at levels 0.01 wt % and 70 wt %. Other variants of this product include crystalline silicon powders with Ag, Cu and/or tin at levels between 0.1 wt % and 50 wt %.

The following are examples of preparation of various product compounds in accordance with an embodiment of the present invention.

Figure 7A:
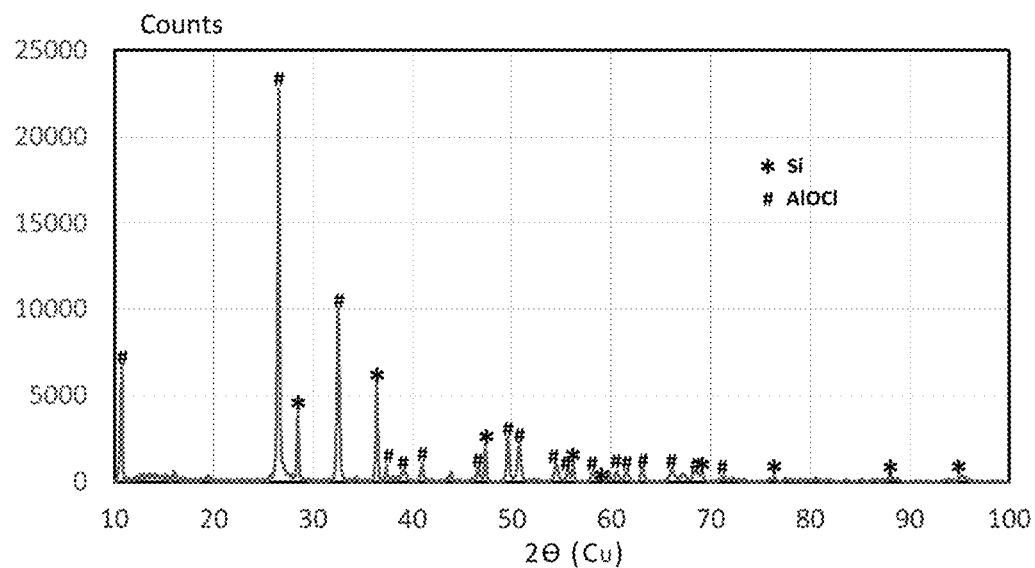
FIGS. 7-a and 7-b show an XRD trace of a powder sample produced from $SiO_2$ nanopowder before and after washing.
Figure 7B:
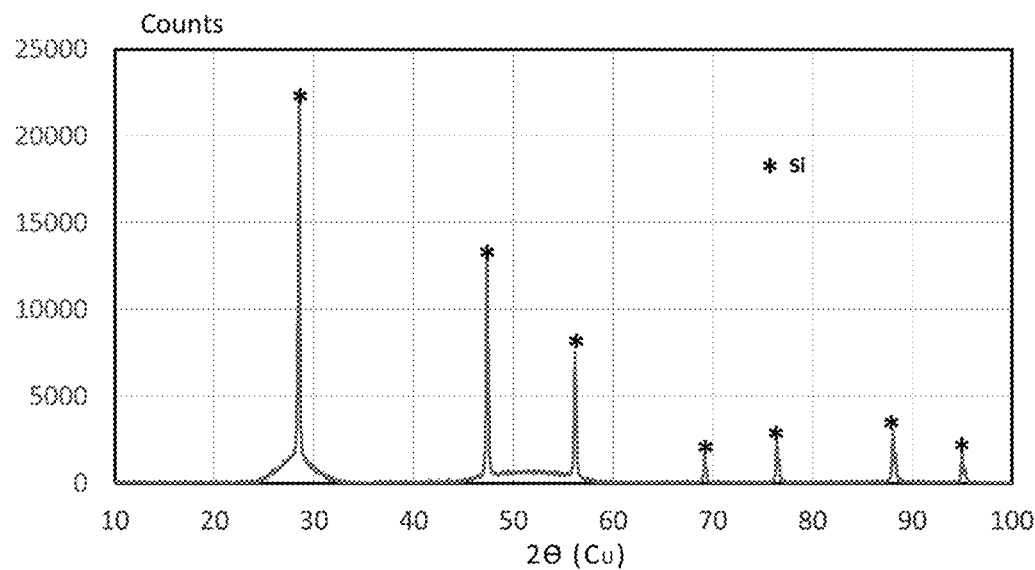

Example 1: Si Nanocrystals Starting from Fumed Silica 50 g of fumed silica ($SiO_2$) are reacted with Al under Ar—$AlCl_3$ at 1 atm at a temperature or 550° C. Al and $AlCl_3$ were premixed together. The $SiO_2$ and the Al—$AlCl_3$ were fed as two separate streams into the reactor over a period of 15 min. The temperature of the reactants was continuously monitored and no measurable temperature increases were detected. Materials obtained at the end of the test have a deep brown colour with a yield >97%; some materials are lost during processing and handling. An XRD analysis of the as-produced materials shows they consist of AlOCl and Si. XRD patterns are shown in FIG. 7-a for the as-obtained product and in FIG. 7-b for washed product after removal of the AlOCl. For unwashed materials, all lines in the XRD spectra can be indexed on the known spectra of AlOCl and crystalline silicon. For FIG. 7-b, only lines corresponding to crystalline silicon can be observed and measured patterns XRD suggest the materials are free of $Al_2O_3$.

PSD analysis of as produced powder in solution suggest a particle size distribution between 20 nm and 100 nm. Extraction of the Si powder results in significant agglomeration with a broad particle size distribution between 50 nm and 200 nm. SEM analysis confirms the presence of agglomerates and that has been observed to result front the washing process. If pure $H_2O$ is used with no HCl, the Si particulates remain suspended in the water indefinitely, and particle size distribution is in the range 10-100 nm.

Example 2: Si Nanocrystals Starting from Silica Nanopowder 100 g of silica nanopowder (70 nm) are reacted with Al and $AlCl_3$ under argon at 1 atm at less than 550° C. Excess $AlCl_3$ is collected in a dedicated vessel for later use. The materials were gradually fed into the reactor as two separate streams over 30 minutes; one $SiO_2$ stream and one Al—$AlCl_3$ mixture stream.

Materials have a brown colour—amount collected is 290 g. Materials discharged and washed in diluted HCl. XRD patterns of washed products match the known XRD spectra of crystalline silicon, and the materials are substantially free of $Al_2O_3$.

Example 3: Si Crystals Starting from Quartz Powder 51 g of quartz powder (0.5-10 microns) are processed with 32 g Al (4 microns) under argon-$AlCl_3$ at 1 atm at a temperature of 550° C. Excess $AlCl_3$ is collected in a dedicated vessel for later use.

Materials discharged and washed in diluted HCl. XRD patterns of the product show the quartz powder has only partially being reduced. All lines in the patterns can be indexed to the known XRD spectra of quartz and crystalline silicon.

Example 4: Si Crystals Starting from $SiO_2$ Fibers 30 g of $SiO_2$ fibres (8 micron diameter) are processed with 18 g Al (4 microns) under argon-$AlCl_3$ at 1 atm at 525° C.

Materials have a brown colour. Materials discharged and washed in diluted HCl. SEM analysis of the product shows a mixture of porous fibres and a powder of small crystals around 1-5 microns. EDS analysis shows the fibres to be made of pure silicon and the crystals to be $Al_2O_3$.

Example 5: $SiO_2$ Coated with Si 82 g of silica nanopowders (20 nm diameter) are processed with Al powder (4 microns) under argon-$AlCl_3$ at 1 atm at a maximum temperature of 550° C. The $SiO_2$ were partially reduced, and the products consisted of $SiO_2$ coated with Si.

Amount of collected materials is 167 g. Materials discharged and washed in diluted HCl. XRD patterns of the product show crystalline silicon and a broad peak around 22 degrees corresponding to amorphous silica.

Example 6: Ag Nanopowder on $SiO_2$ 14 g of the washed products from test outlined in Example 5 were processed with mixture of AgCl—$AlCl_3$ at 550° C.

The materials were discharged (25 g) and washed with diluted $NH_4OH$. XRD analysis indicates Ag and amorphous $SiO_2$.

Example 7: Cu Starting from $CuCl_2$ 14 g of the washed products from test outlined in Example 5 were processed with a mixture of $CuCl_3$—$AlCl_3$ at 400° C. XRD analysis shows a composition consistent with $SiO_2$, Si and Cu.

Example 8: 10% Ag Nanopowder on Si 80 g of silica nanopowder (20 nm) are processed with 47.5 g Al (4 microns) under argon-$AlCl_3$ at 1 atm at a maximum temperature of 550° C. using the same approach in Example 1. 237 g of Si—AlOCl are collected.
80 g or the Si—AlOCl are then processed with a AgCl—$AlCl_3$ at 500° C. Products are then discharged and washed in HCl and then the resulting solid powder is washed in diluted $NH_4OH$. XRD analysis indicate Si and Ag.

Example 9: Ag Nanopowder on Si 42 g of silica nanopowders (20 nm diameter) are processed with a mixture of Al—$AlCl_3$—AgCl at 550° C.
The materials were then discharged and washed in diluted HCL and then in diluted $NH_4OH$. XRD shows patterns consistent with metallic Si and metallic Ag.

Example 10: Glass Flakes Coated with Silicon 200 g of borosilicate glass flakes (~60 microns diameter and 1 micron thick) are processed with Al—$AlCl_3$ (12.5 g Al) under Ar at 550° C. Products are then discharged and washed in $H_2O$.
Materials have a golden colour and consist of borosilicate flakes coated with Si. The XRD analysis shows shallow Si peaks.

Example 11: Glass Flakes Coated with Ag 60 g of Si coated flakes from test in Example 9 are reacted with AgCl—$AlCl_3$. The products were then discharged and washed in diluted $NH_4OH$. XRD analysis show metallic Ag; borosilicates are amorphous and do not show in the XRD patterns.

Example 12: Si-Graphite Composites Starting from Graphite Fumed Silica 50 g of graphite powder (Sigma Aldrich) are milled with 20 g of silica nanopowder (20 nm) and processed with a mixture of Al—$AlCl_3$ at temperatures below 550° C. Excess $AlCl_3$ is collected in a dedicated vessel for later use.

Example 13: Sn from $SnO_2$ 20 g of $SnO_2$ are gradually processed with Al—$AlCl_3$ under Ar at temperatures up to 500° C. Products obtained have a metallic grey colour. An XRD analysis of the as-produced materials shows they consist of Sn, residual $SnCl_2$, $SnO_2$ and AlOCl.

Example 14: Sb from $Sb_2O_5$ 1.45 g of $Sb_2O_3$ is mixed Al—$AlCl_3$(s). The mixture is placed in a quartz tube under argon open to 1 atm. The quartz rube is heated at temperatures increasing from room temperature to 300° C. The reactants are then for 10 min at 500° C. The products are discharged and washed in $H_2O$. XRD analysis of the resulting end-product shows the powder to be made of pure Sb.

Example 15: Ti(Al)—$Al_2O_3$ from $TiO_2$

Mixtures of 10 g of $TiO_2$ and Al—$AlCl_3$(s) are first processed at temperatures starting from 200° C. and increasing to 600° C., leading to intermediate products containing $Ti_2O_3$. Intermediate products are then processed at 800° C. for 10 min. XRD analysis of the resulting product shows the powder to be made of $Ti_3O$, $Ti_3Al$ and $Al_2O_3$.

Example 16: Mo from $MoO_3$ 2 g of $MoO_3$—Al—$AlCl_3$(s) in a stoichiometric ratio with 50% excess $AlCl_3$ are placed in a quartz tube under argon open to 1 atm. The quartz tube is heated at temperatures increasing from room temperature to 500° C. The products are discharged and washed in $H_2O$. XRD analysis of the resulting end-product shows the powder to be made of pure Mo.

Example 17: Cu Starting from CuO 100 g of CuO are gradually processed with Al—$AlCl_3$. The CuO and Al—$AlCl_3$ were gradually fed into a stainless-steel vessel equipped with a mixer under argon open to 1 atm at 500° C. (total time 30 min). After 10 min, the temperature is increased to 600 C for a further 15 min. XRD analysis show the materials to be a mixture of Cu and some residual $Cu_2O$.

Example 18: Skeletal Ni Starting from NiO 30 g NiO an gradually processed with excess amounts of Al—$AlCl_3$ under argon at 1 atm at 500° C. over a period of 10 min, and the then the mixture is left to react for a further 30 min. The temperature is then increased to 600 C for a further 15 min. XRD analysis suggests the materials to be a mixture of $Al_2O_3$, Ni, NiO and Al, with $Al_3Ni$ as the dominant phase.
The materials are then washed in NaOH and then rinsed with water several times to produce a highly magnetic compound. The materials are kept under water as they tend to burn upon drying. Burnt powder consists of NiO with no sign of Al and/or $Al_2O_3$ or any other Al-based compounds.

Example 19: Fe—Co—Ni—Al2O3 Starting from Fe2O3-Co3O4-NiO

Mixtures of 37 g $Fe_2O_3$+8 g $Co_3O_4$+4 g NiO and A—$AlCl_3$ are processed in a stainless-steel vessel under argon at 300° C. for 10 min, and the then the mixture is left to react for a further 30 min. The temperature is then increased to 600° C. for a further 15 min. XRD analysis show the materials to be a mixture of $Al_2O_3$, and various phase of Fe—Co—Ni.

Example 20: Zn Starting from ZnO 50 g of ZnO are reacted with a mixture of Al powder (4 microns) and $AlCl_3$ for 30 min. XRD analysis suggests the as-produced materials contains Zn, AlOCl together with a residual amount of Al and AlCl$_3$. Discharged powder is washed dried and end-products consist of Zn with residual Al.

Example 21: W from WO$_3$ 50 g of WO$_3$ are reacted with a mixture of Al powder (4 microns) and AlCl$_3$ at 500° C. over a period of 10 min, and then the mixture is left to react for a further 30 min. XRD analysis show the as-produced products shows the materials to be made of W and AlOCl together with a residual amounts of tungsten oxides/oxychlorides and Al. Discharged powder is washed dried and end-products consist mostly of W with residual tungsten compounds most likely oxychlorides.

Example 22: W—Al$_2$O$_3$ from WO$_3$ 2 g WO$_3$ of as obtained materials from example 20 are heated at 700° C. XRD analysis of the resulting products suggest the compositions is W—Al$_2$O$_3$.

Example 23: Ti(Al) from TiO$_2$

Powders of 1 g of TiO$_2$, 0.1 g Al and 2.5 g AlCl$_3$(s) were mixed together. A quartz tube was placed inside a tube furnace and heated at 300° C. The mixture was gradually fed into the tube until all finished and then remixed and left at 300° C.; for a further 10 min. The mixture was then discharged, and 0.35 g of Al was guided. The temperature was set at 500° C. and the mixture gradually fed until all done.

2.7 g of deep black powder was collected. XRD analysis indicate presence of AlOCl. 1 g of the products were then heated at 650° C. for 10 min and 0.5 g of powder was collected. XRD analysis of the obtained products suggests it is made of Ti—Al and Al$_2$O$_3$. The heating caused the AlOCl to disproportionate into Al$_2$O$_3$.

Example 24: Blue TiO$_2$ from Rutile TiO$_2$

Powders of 2 g of TiO$_2$ (rutile—nanopowders) are mixed with 0.1 g Al and 2 g AlCl$_3$(s). The mixture is placed in a quartz tube and heated at 200° C. for 30 min. The resulting product is then discharged and washed. The end-product has a blue colour consisting of TiO2 with Ti$^{3+}$ vacancies resulting from reactions with Al—AlCl$_3$. Limited reactions between the starting TiO$_2$ and the mixture Al—AlCl$_3$ results in loss of oxygen from the starting TiO$_2$ rutile, and this loss is responsible for the change of colour from white to blue.

Example 25: Si Monoxide Starting from Silica Nanopowder 100 g of silica nanopowder (20 nm) are reacted with a sub-stoichiometric amount of Al under argon at 1 atm at less than 550° C. Excess AlCl$_3$ is collected in a dedicated vessel for later use.

Materials have a light brown colour—amount collected is 251 g. Materials discharged and washed in diluted HCl. XRD patterns of washed products match the known XRD spectra of crystalline silicon, and the materials are substantially free of Al$_2$O$_3$.

It will be understood to persons skilled in the art of the invention that many modifications may be made without departing from the spirit and scope at the invention. For example, the inventor expect that it would be possible to use Mg instead of Al as the reducing agent without significant departures from the core of the invention. If Mg is used instead of Al, for example, by-products might include a mixture of MgAl$_2$Cl$_8$ and AlOCl, both of which are soluble in diluted HCl and should thus be separable from the base metal products. It is intended that such modifications are within the scope of the present invention.

It is to be understood that any prior art publication referred to herein does not constitute an admission that the publication forms part of the common general knowledge in the art.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for producing a powder comprising silicon, the method comprising:
providing a reaction mixture comprising a silicon oxide containing precursor and an aluminum reductant;
heating the reaction mixture at atmospheric pressure in the presence of gaseous aluminum chloride or a mixture of solid and gaseous aluminum chloride to a temperature of between 300° C. and 600° C., whereby reactions that result in the silicon oxide being reduced are initiated, the amount of the aluminum chloride being between 1 wt % and 500 wt % of the weight of the silicon oxide containing precursor;
controlling reaction conditions to maintain the temperature below 650° C., whereby the reaction mixture is prevented from reaching a temperature at which thermal runaway can occur and whereby the formation of aluminium oxychloride as a by-product is favored over aluminum oxide; and
washing products of the reaction in dilute acid to isolate the silicon powder.

2. A method for producing a powder comprising silicon, the method comprising:
feeding a silicon oxide containing precursor and an aluminum reductant into a reaction vessel at atmospheric pressure and at a temperature of between 300° C. and 600° C., in the presence of gaseous aluminum chloride or a mixture of solid and gaseous aluminum chloride;
mixing the reactants together and in the presence of reaction products that form;
controlling a feed rate of the silicon oxide containing precursor and the aluminum reductant into the reaction vessel such that the temperature in the reaction vessel does not exceed 650° C.; and
washing the reaction products in dilute acid to remove aluminum oxychloride by-product and isolate the silicon powder.

3. The method of claim 1 or claim 2, where the solid aluminum chloride is provided in the form of a powder or granules of aluminum chloride with a particle size less than 5 mm.

4. The method of claim 1, wherein the silicon oxide containing precursor, aluminum reductant, and solid aluminum chloride in the reaction mixture are independently provided in the form of a powder, flakes, fibers or particulates.

5. The method of claim 1 or claim 2, wherein the aluminum reductant is aluminum or an aluminum alloy in the form of a powder or flakes with a particle size of less than about 50 μm in at least one dimension.

6. The method of claim 1 or claim 2, wherein the amount of the aluminum reductant is between 5 wt % and 500 wt % of the weight of the silicon oxide containing precursor.

7. The method of claim 1 or claim 2, wherein the reaction mixture is heated in an inert atmosphere.

8. The method of claim 1, wherein the reaction conditions are controlled by one or more of gradually feeding additional one or both of the silicon oxide containing precursor and the aluminum reductant into the heated reaction mixture; by cooling the reaction mixture by external means; and/or using a thermal load moderator to the reaction mixture.

9. The method of claim 1 or claim 2, wherein gaseous aluminum chloride formed during the reaction is condensed for recycling back into the reaction mixture.

10. The method of claim 1 or claim 2, wherein the silicon powder is a powder of silicon or a mixture of silicon and $SiO_2$ having a particle size of less than 500 nm.

11. The method of claim 1 or claim 2, wherein the reduction reaction is carried out at a temperature of between 450° C. and 600° C.

12. The method of claim 1 or claim 2, wherein the reduction reaction is carried out at a temperature of between 400° C. and 550° C.

13. The method of claim 1 or claim 2, wherein alloying additives are included with the silicon oxide containing precursor, the alloying additives include one ore more of pure elements, chlorides, oxides or nitrides based on Zn, Cu, Fe, Ni, Co, Cr, Mo, Sn, Ti, In, Sb, Ag, V, Mn, Pt, Pd, Ta, Zr, Nb, Rh, Ru, Os, Re, C, B and W.

\* \* \* \* \*